US010853621B2

(12) United States Patent
Mizoguchi

(10) Patent No.: US 10,853,621 B2
(45) Date of Patent: *Dec. 1, 2020

(54) DERMAL IMAGE INFORMATION PROCESSING DEVICE, DERMAL IMAGE INFORMATION PROCESSING METHOD, AND PROGRAM

(71) Applicant: NEC CORPORATION, Tokyo (JP)

(72) Inventor: Masanori Mizoguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,452

(22) Filed: Sep. 7, 2018

(65) Prior Publication Data

US 2019/0019010 A1 Jan. 17, 2019

Related U.S. Application Data

(63) Continuation of application No. 15/736,146, filed as application No. PCT/JP2016/067791 on Jun. 15, 2016.

(30) Foreign Application Priority Data

Jun. 15, 2015 (JP) .................................. 2015-120660

(51) Int. Cl.
*G06K 9/00* (2006.01)
*G06T 7/00* (2017.01)
(Continued)

(52) U.S. Cl.
CPC .......... *G06K 9/00114* (2013.01); *G06F 21/32* (2013.01); *G06K 9/0012* (2013.01);
(Continued)

(58) Field of Classification Search
CPC .... G06K 9/00114; G06K 9/34; G06K 9/0012; G06K 9/4652; G06F 21/32
See application file for complete search history.

(56) References Cited

U.S. PATENT DOCUMENTS 9,418,276 B2 * 8/2016 Yamada ............. G06K 9/00073
2003/0076986 A1 4/2003 Yoon et al.
(Continued)

FOREIGN PATENT DOCUMENTS

EP 3 279 861 A1 2/2018
JP 09-044666 A 2/1997
(Continued)

OTHER PUBLICATIONS

Busch et al., "Presentation attack detection methods for fingerprint recognition systems: a survey", IET Biometrics, vol. 3, No. 4, Dec. 1, 2014, pp. 219-233 (total 15 pages).
(Continued)

*Primary Examiner* — Ruiping Li
(74) *Attorney, Agent, or Firm* — Sughrue Mion, PLLC

(57) ABSTRACT

A dermal image information processing device includes a memory; and a hardware component that reads data from the memory and performs: acquiring dermal image information showing ridge lines in a papillary layer; detecting an singular region caused by a surgical operation in the dermal image; determining a type of the surgical operation that is a cause of generation of the singular region; generating a repaired image showing ridge lines in a papillary layer prior to the surgical operation, based on the type of the surgical operation; and collating the repaired image with a pre-registered dermal image.

12 Claims, 11 Drawing Sheets

(51) Int. Cl.
*G06F 21/32* (2013.01)
*G06K 9/34* (2006.01)
*G06K 9/46* (2006.01)

(52) U.S. Cl.
CPC ............... *G06K 9/34* (2013.01); *G06T 7/00* (2013.01); *G06K 9/00087* (2013.01); *G06K 9/4652* (2013.01)

(56) References Cited

U.S. PATENT DOCUMENTS

| | | |
|---|---|---|
| 2006/0126908 A1 | 6/2006 | Moon et al. |
| 2007/0076926 A1 | 4/2007 | Schneider et al. |
| 2012/0224041 A1 | 9/2012 | Monden |
| 2014/0079686 A1 | 3/2014 | Barman et al. |

FOREIGN PATENT DOCUMENTS

| | | |
|---|---|---|
| JP | 10-187266 A | 7/1998 |
| JP | 2003-331270 A | 11/2003 |
| JP | 2013-171306 A | 9/2013 |
| JP | 2013-171325 A | 9/2013 |
| WO | 2011/058836 A1 | 5/2011 |

OTHER PUBLICATIONS

Ellingsgaard et al., "Detecting Fingerprint Alterations by Orientation field and Minutiae Orientation Analysis", 2nd International Workshop on Biometrics and Forensics, Mar. 1, 2014, pp. 1-6 (total 6 pages).

Yoon et al., "Altered Fingerprints: Analysis and Detection", IEEE Transactions on Pattern Analysis and Machine Intelligence, Mar. 2012, vol. 34, No. 3, pp. 451-464 (total 14 pages).

Communication dated Jan. 18, 2019 from European Patent Office in counterpart EP Application No. 16811650.7.

Yoon et al., "On Matching Altered Fingerprints", IEEE, 2012, pp. 222-229 (8 pages total).

Communication dated Jun. 24, 2019, from the United States Patent and Trademark Office in counterpart U.S. Appl. No. 15/736,146.

Bossen, A. et al., "Internal Fingerprint Identification With Optical Coherence Tomography", IEEE Photonics Technology Letters, vol. 22, No. 7, pp. 507-509, Apr. 1, 2010, [online] URL<https://ieeexplore.ieee.org/document/5404747>, 4 pages total.

Korohoda, P. et al., "Optical Coherence Tomography for Fingerprint Acquisition from Internal Layer—A Case Study", IEEE,, SPA 2014, Signal Processing: Algorithms, Architectures, Arrangements, and Applications, pp. 176-180, Sep. 2014, [online], URL<https://ieeexplore.ieee.org/document/7067292>, 6 pages total.

Office Action dated Sep. 24, 2019 issued by the Japanese Patent Office in Application No. 2017-525258.

Asker M. Bazen, "Fingerprint Identification—Feature Extraction, Matching, and Database Search," Twente University Press, Aug. 19, 2002, 195 pages.

International Search Report of PCT/JP2016/067791 dated Sep. 13, 2016.

Kazuharu Yamato et al., "An Improvement of the Fingerprint Identification system," The Journal of the Institute of Image Electronics Engineers of Japan, Aug. 25, 1995, pp. 382-391, vol. 24, No. 4.

Communication dated Jan. 29, 2020 from the United States Patent and Trademark Office in U.S. Appl. No. 16/125,404.

\* cited by examiner

DERMAL IMAGE INFORMATION PROCESSING DEVICE, DERMAL IMAGE INFORMATION PROCESSING METHOD, AND PROGRAM

CROSS-REFERENCE TO RELATED APPLICATIONS

This is a Continuation Application of U.S. application Ser. No. 15/736,146 filed on Dec. 13, 2017, which is a National Stage of International Application No. PCT/JP2016/067791 filed Jun. 15, 2016, and which claims priority based on Japanese Patent Application No. 2015-120660 filed on Jun. 15, 2015, the contents of all of which are incorporated herein by reference in their entirety.

TECHNICAL FIELD

The present invention relates to a dermal image information processing device, a dermal image information processing method, and a program.

BACKGROUND ART

In recent years, biometric authentication has attracted attention as one of the authentication methods for identifying individuals. A biometric pattern such as a fingerprint has a feature that it does not change even after years of time, and is highly reliable for authentication. Meanwhile, still there is a possibility of unauthorized acts using false biometric patterns such as false fingers, and techniques for preventing such unauthorized acts have also been developed.

For example, the technique disclosed in Patent Document 1 is a technique for determining a false finger with a transparent thin film attached on the surface of a finger. Patent Document 1 discloses a technique of classifying an image region into a plurality of regions including at least a skin region and a background region by using colors of pixels included in a captured image, and using a characteristic of a region that is not classified either as the skin region or as the background region, to thereby determine whether or not a foreign object is present around a finger. According to this technique of Patent Document 1, a foreign object around a finger (a portion having a biological pattern) can be detected.

PRIOR ART DOCUMENTS

Patent Documents

[Patent Document 1] PCT International Publication No. WO 2011/058836

SUMMARY OF INVENTION

Problem to be Solved by the Invention

In the case of using a fingerprint as information for identifying an individual, if the state of the skin of the finger is not good, there is a possibility that the same person is judged as another person. For example, in the case where the fingerprint is unclear due to roughness, wrinkles due to aging and the like, or burns, the accuracy of fingerprint identity determination and the accuracy of abnormality detection are reduced, and there is a possibility that the same person is judged as another person.

An exemplary object of the present invention is to provide a dermal image information processing device, a dermal image information processing method, and a program, that are capable of solving the above problems.

Means for Solving the Problem

A dermal image information processing device according to a first exemplary aspect of the present invention includes: a dermal image information acquisition unit that acquires image information indicating an image of a papillary layer; and a singular region detection unit that detects a singular region indicating damage of the papillary layer, based on the acquired image information.

A dermal image information processing method according to a second exemplary aspect of the present invention includes: acquiring image information indicating an image of a papillary layer, and detecting a singular region indicating damage of the papillary layer, based on the acquired image information.

A program according to a third exemplary aspect of the present invention causes a computer to execute: acquiring image information indicating an image of a papillary layer, and detecting a singular region indicating damage of the papillary layer, based on the acquired image information.

Effect of the Invention

According to the present invention, even when the state of the skin is not good, it is possible to reduce the possibility that the same person is erroneously judged as another person.

EMBODIMENTS FOR CARRYING OUT THE INVENTION

Hereinafter, exemplary embodiments of the present invention will be described. However, the following exemplary embodiments do not limit the invention according to claims. Moreover, not all combinations of the features described in the exemplary embodiments are necessarily essential to the solution provided by the invention.

First Exemplary Embodiment

Figure 1:
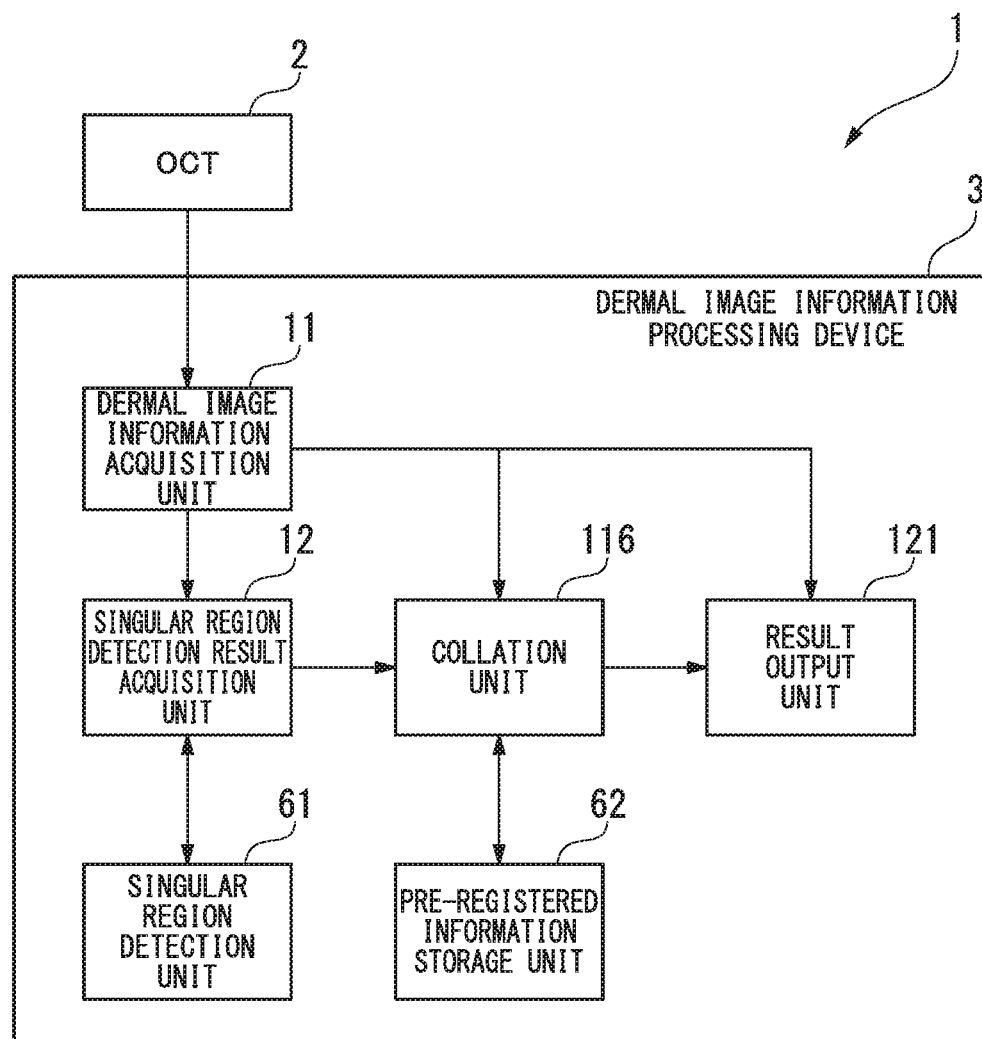
FIG. 1 is a schematic block diagram showing a functional configuration of an image information processing system according to a first exemplary embodiment.

FIG. 1 is a schematic block diagram showing a functional configuration of an image information processing system according to a first exemplary embodiment of the present invention. As shown in FIG. 1, the image information processing system 1 includes an OCT (optical coherence tomography) 2 and a dermal image information processing device 3. The dermal image information processing device 3 includes a dermal image information acquisition unit 11, a singular region detection result acquisition unit 12, a singular region detection unit 61, a pre-registered information storage unit 62, a collation unit 116, and a result output unit 121.

The OCT 2 and the dermal image information processing device 3 may be integrally configured. For example, the computer included in the OCT 2 may execute the function of the dermal image information processing device 3.

The OCT 2 obtains mutual interference caused by the phase difference between light reflected by emitting the finger as the observation target (laser light), and reference light, as an image of the pattern of light intensity. In the OCT 2, by appropriately changing the wavelength of the light, not only information on the surface of the finger but also information on the pattern inside the living body, from the surface to a certain depth (a depth of about several hundreds of micrometers or 2000 micrometers), can also be acquired. Particularly, the OCT 2 acquires the position information of the papillary layer of the finger, and generates the image information (data indicating the image) of the papillary layer. A general OCT can be used as the OCT 2.

Instead of the OCT 2, a device capable of obtaining an image of the papillary layer with a device other than the OTC, for example, an ultrasonic tomographic imaging device may be used.

The papillary layer is a layer located at the boundary with the epidermis of the dermis. Human skin is formed by overlapping of epidermis and dermis. The epidermis is present on the surface side (outside), and the dermis is present on the far side (inside). The papillary layer exists at the portion where the epidermis and the dermis are in contact with each other. In the vicinity of this papillary layer, concaves and convexes are present on the dermis side. This convex part forms ridge lines. Sweat gland pores are aligned along the convex part of the ridge line. The ridge line pattern formed on the dermis side can also be seen as it is on the epidermis side. This pattern is generally called a fingerprint. Even if the epidermis is temporarily damaged, as long as the ridge line structure in the dermis is maintained, when the epidermis is regenerated, a pattern based on the ridge line structure of the original dermis side is reproduced also on the epidermis side. The shape of the protuberance (convex part) of this papillary layer can be regarded as being the same as the (original) shape of the ridge line.

In the following, the protuberance forming the ridge line in the papillary layer is referred to as a dermal ridge line. Also, the pattern of the dermal ridge line is referred to as a dermal fingerprint.

The dermal image information acquisition unit 11 acquires image information of the papillary layer generated by the OCT 2.

The singular region detection result acquisition unit 12 acquires information on a singular region of the papillary layer detected based on the image information acquired by the dermal image information acquisition unit 11.

More specifically, the singular region detection result acquisition unit 12 requests the detection of the singular region, by passing the image information of the papillary layer passed from the dermal image information acquisition unit 11 to the singular region detection unit 61. Then, the singular region detection result acquisition unit 12 receives the information on the singular region detection result based on this request. A specific processing method for detecting the singular region will be described later. The information on the detection result received by the singular region detection result acquisition unit 12 includes information on the presence or absence of a singular region in the image information of the passed papillary layer, and when a singular region exists, information on the location (coordinate etc.) thereof.

The singular region is a region in which a pattern unique to the dermal fingerprint (a pattern different from a normal pattern) exists due to factors such as a part of the living body being damaged. Examples of the cause of living body damage causing a singular region to occur include a deep injury that reaches the dermis, such as cuts, burns, burn sores due to chemicals (for example, strong acids), and the like.

A specific method for detecting the singular region will be described later.

The collation unit 116 performs collation processing between the dermal image information in the region other than the singular region in the dermal image information acquired by the dermal image information acquisition unit 11, and the pre-registered image information preliminarily registered in the pre-registered information storage unit 62. The collation unit 116 acquires information on the presence or absence of a singular region and information on the position (range) of the singular region from the singular region detection result acquisition unit 12. When performing the above collation processing, the collation unit 116 can make at least either one of a positional deviation allowance which represents a degree to which positional deviation is allowed, and a mismatch allowance which represents a degree to which a mismatch is allowed, to be variable. When it is determined that there is a singular region based on the information acquired by the singular region detection result acquisition unit 12, the collation unit 116 may perform adjustment so as to change either or both of the allowances in a direction in which the allowance increases (that is, in a direction in which it is considered that the degree of matching is increased even if there are some differences).

The collation process itself performed by the collation unit 116 can be performed using existing techniques. An outline of the process of collating a dermal fingerprint is as follows. For the collation processing, the collation unit 116 extracts characteristics of the input dermal fingerprint image. The characteristics include the dermal ridge line directions of the dermal fingerprint, the statistical values relating to the distribution of the direction of the dermal fingerprint, the manner of connection of dermal ridge lines, the number of directional singular points of the dermal ridge line for each type (the directional singular points such as a true circular core, a semicircular core, and delta which will be described later), the mutual positional relationship of the directional singular points, the orientation of straight lines connecting a plurality of directional singular points, and the angle formed by these straight lines. The collation unit 116 determines whether or not the plurality of dermal fingerprint images come from the same fingerprint by evaluating the above-described characteristics of the plurality of dermal fingerprint images (or may compare with the fingerprint image) with the proximity and/or the distance in the characteristic space. In one example, the collation unit 116 compares the characteristics of the dermal fingerprint image (or fingerprint image) preliminarily registered in the database against the newly input dermal fingerprint image, and determines whether or not both images match.

In this type of collation processing, the above-mentioned positional deviation allowance is for example a value that represents the degree to which the error in the position of the characteristic point in the fingerprint image is allowed. In addition, the above-mentioned mismatching allowance is a value that indicates the degree to which characteristic mismatching is still allowed while it is regarded as matching, when the two fingerprint images to be compared do not completely match. For example, the mismatching allowance may be represented by a distance that is appropriately defined in the characteristic space, or may be expressed by the degree of the weight of the penalty that is given according to the distance.

The result output unit 121 outputs the collation result of the collation unit 116. The result output unit 121 may display the collation result on a screen, or may transmit the collation result to another device.

The result output unit 121 may output information indicating the singular region detected by the singular region detection unit 61, in addition to or instead of the collation result of the collation unit 116. Regarding the output of the information indicating the singular region, the result output unit 121 may display the singular region on a screen, or the information indicating the singular region may be transmitted to another device.

The singular region detection unit 61 performs a process of analyzing image information of the papillary layer passed from the singular region detection result acquisition unit 12, and determines whether or not a singular region is included in the image of the papillary layer. The singular region detection unit 61 outputs information on the presence or absence of a singular region as a determination result. Moreover, when a singular region is included in the image of the papillary layer, the singular region detection unit 61 outputs information on the position (position information indicating the range of the region). Details of the determination processing by the singular region detection unit 61 will be described later.

The pre-registered information storage unit 62 stores fingerprint image information or papillary layer image information registered preliminarily as biological pattern information. The pre-registered information storage unit 62 holds the biological pattern information (fingerprint image information or papillary layer image information) in association with identification information for identifying the individual. Further, the pre-registered information storage unit 62 may further hold the above identification information and personal attribute information in association with each other. Specific examples of individual attribute information include name, information on registered residence, and information on individual legal status. The pre-registered information storage unit 62 uses, for example, a magnetic hard disk device, a semiconductor memory, or the like as a means for storing information.

[Regarding Method of Singular Region Detection Processing]

In the following, an internal configuration of the singular region detection unit 61 and a method of singular region detection processing will be described.

Figure 2:
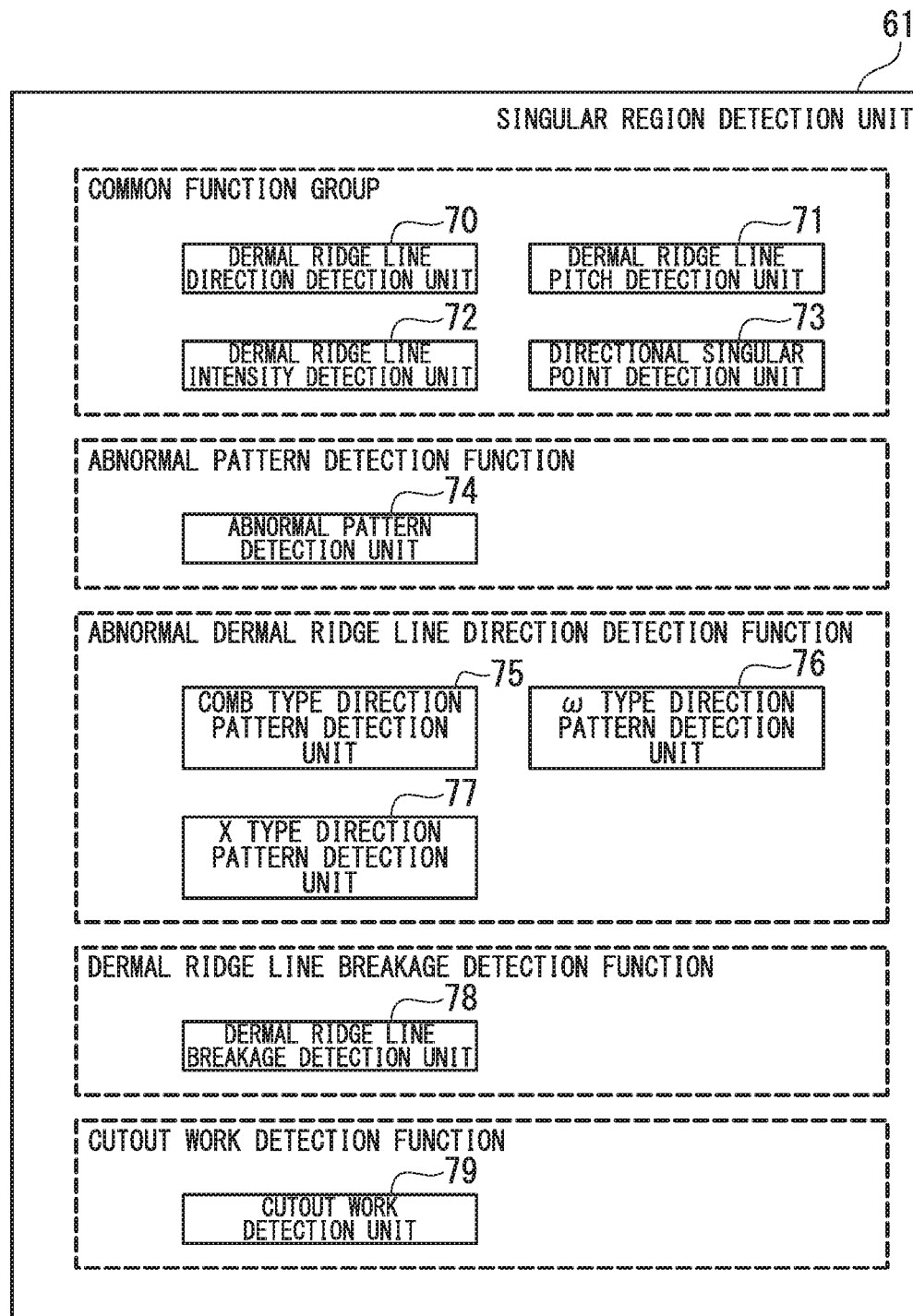
FIG. 2 is a block diagram showing a schematic functional configuration inside a singular region detection unit in the first exemplary embodiment.

FIG. 2 is a block diagram showing a schematic functional configuration inside the singular region detection unit 61. As shown in FIG. 2, the singular region detection unit 61 includes a common function group, an abnormal pattern detection function, an abnormal dermal ridge line direction detection function, a dermal ridge line breakage detection function, and a cutout work detection function. The common function group includes a dermal ridge line direction detection unit 70, a dermal ridge line pitch detection unit 71, a dermal ridge line intensity detection unit 72, and a directional singular point detection unit 73. The operation of the singular region detection unit 61 using these functions will be described below.

The singular region detection unit 61 first receives data of a dermal fingerprint image from the singular region detection result acquisition unit 12.

The singular region detection unit 61 analyzes the received dermal fingerprint image using functions included in the common function group thereof. Specifically, the dermal ridge line direction detection unit 70 detects a dermal ridge line direction in the dermal fingerprint image. The dermal ridge line pitch detection unit 71 detects a dermal ridge line pitch in the dermal fingerprint image. The dermal ridge line intensity detection unit 72 detects a dermal ridge line intensity in the dermal fingerprint image. The directional singular point detection unit 73 detects a directional singular point (singular point) in the dermal fingerprint image. The singular region detection unit 61 may detect only any one of a dermal ridge line direction, a dermal ridge line pitch, a dermal ridge line intensity, and a direction singularity, but not all of them. The process itself of detecting these dermal ridge line pitch, dermal ridge line intensity, and directional singular point from the dermal fingerprint image is similar to a feature extraction process in a general fingerprint authentication technique and can be performed using existing techniques.

A dermal ridge line direction is a direction in which the dermal ridge line is oriented. A dermal ridge line pitch is a width of parallel dermal ridge lines (a distance from one dermal ridge line to another dermal ridge line that is parallel to or adjacent to that dermal ridge line). A dermal ridge line intensity is a degree indicating the likelihood of being a dermal ridge line as information obtained from an image. A directional singular point is a portion where a dermal ridge line direction becomes discontinuous in a dermal fingerprint image.

The singular region detection unit 61 first extracts a dermal ridge line direction, a dermal ridge line pitch, and a dermal ridge line intensity from the received dermal fingerprint image using Gabor filters. Specifically, the singular region detection unit 61 applies the Gabor filters in which the direction and pitch are stepwise changed for each pixel included in the dermal fingerprint image. The singular region detection unit 61 regards the direction and the pitch of the filter that yields the highest absolute value among these applied Gabor filters as the dermal ridge line direction and pitch at that pixel. In addition, the absolute value of the filter applied value at that time is extracted as the dermal ridge line intensity.

The singular region detection unit 61 detects a directional singular point in the dermal fingerprint image. At a directional singular point there exists a directional shape called a delta and a directional shape called a core. Of these, the core can be further classified into a true circular core and a semicircular core. A true circular core is a core whose dermal ridge line rotates 360 degrees around the directional singular point. A semicircular core is a core whose dermal ridge line rotates 180 degrees around the directional singular point. However the semicircular core that is actually detected is not limited to rotation of exactly 180 degrees. As a method of detecting a directional singular point, the singular region detection unit 61 may use an existing technique. As an example, a method for detecting a directional singular point is also disclosed in the literature [Asker Michel Bazen, "Fingerprint identification: Feature Extraction, Matching, and Database Search", Twente University Press, 2002]. For each finger, the singular region detection unit 61 stores the number of each of the detected true circular cores, semicircular cores, and deltas and the position (coordinates) of the directional singular point of each of these, for processing in a later step. The singular region detection unit 61 detects the direction of the pattern at the directional singular point (for example, in the case of a semicircular core, whether the side on which the dermal ridge line is open is the upper side or the lower side of the finger), and stores the information for processing in a later step.

In addition to the example of the existing technique mentioned above, the singular region detection unit 61 may use yet another method. In order to improve the accuracy, the singular region detection unit 61 may also use in combination another means for correcting extraction errors in dermal ridge line direction and dermal ridge line pitch.

Next, the singular region detection unit 61 performs processing for detecting four types of singular regions in the dermal fingerprint image. The four types are (1) abnormal pattern, (2) abnormal dermal ridge line direction, (3) dermal ridge line breakage, and (4) cutout work. The features of the dermal fingerprints having these four types of abnormality and the detection methods thereof will be described below.

((1) Abnormal Pattern Detection)

The singular region detection unit 61 includes an abnormal pattern detection unit 74 as a function for detecting an abnormal pattern. The abnormal pattern detection unit 74 detects an abnormal pattern based on the number and positional relationship of the directional singular points (delta, semicircular core, perfect circle core) detected above. Normal dermal fingerprint images are classified into four types of patterns from the dermal ridge line direction patterns. The four types are arch-shaped pattern, loop-shaped pattern, spiral-shaped pattern, and variant-shaped pattern. For each of these patterns, the number and positional relationship of the directional singular points are defined.

Specifically, in the arch-shaped pattern, the number of semicircular cores is 0 or 1, and the number of deltas is also 0. That is to say, the curve of the dermal ridge line is smooth. In the loop-shaped pattern, the number of semicircular cores is 1, and the number of deltas is 1 or less. In the spiral-shaped pattern, either the number of circular cores is 1 and the number of deltas is 2 or less, or the number of semicircular cores is 2 and the number of deltas is 2 or less. In the variant-shaped pattern, either the number of semicircular cores is 3 and the number of deltas is 3 or less, or the number of circular cores is 1, the number of semicircular cores is 1, and the number of deltas is 3 or less. In the case of a normal dermal fingerprint image, the positional relationship of the directional singular point also has a predetermined restriction.

Normal dermal fingerprint images have the above patterns. The abnormal pattern detection unit 74 detects an abnormal pattern image that cannot appear in a normal dermal fingerprint image as an abnormal pattern. Specifically, the singular region detection unit 61 detects the dermal fingerprint image as an abnormal pattern when any one of the following conditions (A) to (F) is satisfied.

Condition (A): When there are two or more circular cores

Condition (B): When there are four or more semicircular cores

Condition (C): When two or more semicircular cores are present and one or more circular cores are also present Condition (D): When there are four or more deltas Condition (E): Delta is present above the core (on the side near the fingertip)

Condition (F): When there are two or more semicircular cores on the upper side

That is to say, the singular region detection unit 61 detects the directional singular point of the dermal ridge line included in the dermal fingerprint image, and detects a singular region based on the condition of the number of each directional singular point type or the condition of the positional relationship between the types of the directional singular points.

One of the reasons why these types of abnormal patterns are detected in dermal fingerprints is a surgical treatment applied to the finger. When deforming the fingerprint intentionally by a surgical operation, surgical operations including operations on the dermis may be performed, since the fingerprints return to original due to the metabolism of the skin, merely by deforming the epidermis. When a surgical operation is performed on the dermis in this manner, the abnormal pattern as described above can be detected.

Figure 3A:
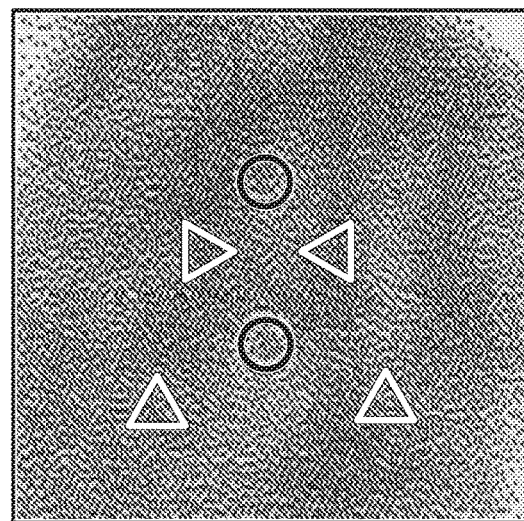
FIG. 3A is a diagram showing an example of an abnormal pattern in a dermal fingerprint in the first exemplary embodiment.
Figure 3B:
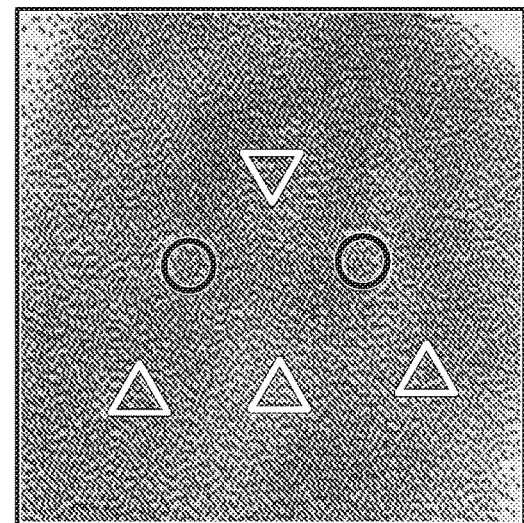
FIG. 3B is a diagram showing an example of an abnormal pattern in a dermal fingerprint in the first exemplary embodiment.
Figure 3C:
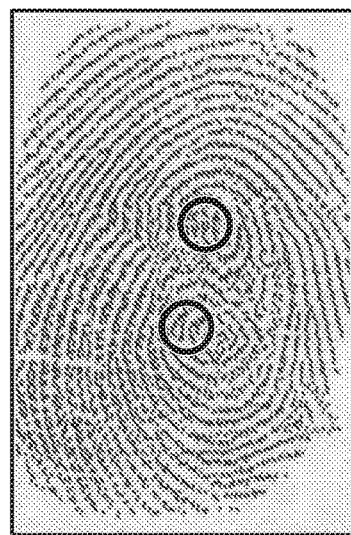
FIG. 3C is a diagram showing an example of an abnormal pattern in a dermal fingerprint in the first exemplary embodiment.

FIG. 3A to FIG. 3C show examples of abnormal patterns in dermal fingerprints. In FIG. 3A to FIG. 3C, the circled portions are circular cores. Also, the portions indicated by triangles are deltas. The example of the dermal fingerprint image shown in FIG. 3A has two circular cores and four deltas. That is to say, this dermal fingerprint image meets the above conditions (A) and (D), and the abnormal pattern detection unit 74 determines that it has an abnormal pattern. The example of the dermal fingerprint image shown in FIG. 3B has two circular cores and four deltas. Also, in the example of FIG. 3B, a delta exists above the two circular cores. That is to say, this dermal fingerprint image meets the above conditions (A), (D), and (E), and the abnormal pattern detection unit 74 determines that it has an abnormal pattern. The example of the dermal fingerprint image shown in FIG. 3C has two circular cores. That is to say, this dermal fingerprint image meets the above condition (A), and the abnormal pattern detection unit 74 determines that it has an abnormal pattern.

If an abnormal pattern is detected, the abnormal pattern detection unit 74 outputs the type of the abnormality (any of (A) to (F) above) and the position and type of the directional singular point concerning the abnormality.

Further, if an abnormal pattern is not detected, the abnormal pattern detection unit 74 outputs information indicating that an abnormal pattern is not detected.

((2) Abnormal Dermal Ridge Line Direction Detection)

The singular region detection unit 61 detects an abnormal pattern in the dermal ridge line directions. There are several patterns also in abnormal dermal ridge line directions. Typical three types of patterns are called comb type direction pattern, ω type direction pattern, and X type direction pattern for convenience. In the present exemplary embodiment, the singular region detection unit 61 detects three types of abnormal dermal ridge line directions, namely the comb type direction pattern, the ω type direction pattern, and the X type direction pattern. There is a possibility that these types of abnormal dermal ridge line direction patterns may be observed at a boundary portion of the transplanted epidermis part if an epidermis and dermis transplant operation or the like has been performed. These patterns cannot be seen in normal dermal fingerprint images.

Figure 4A:
FIG. 4A is a diagram showing an example of a dermal fingerprint image including an abnormal dermal ridge line direction in the first exemplary embodiment.
Figure 4B:
FIG. 4B is a diagram showing an example of a dermal fingerprint image including an abnormal dermal ridge line direction in the first exemplary embodiment.
Figure 4C:
FIG. 4C is a diagram showing an example of a dermal fingerprint image including an abnormal dermal ridge line direction in the first exemplary embodiment.

FIG. 4A to FIG. 4C show examples of dermal fingerprint images including abnormal dermal ridge line directions.

FIG. 4A is an example of a dermal fingerprint image having an abnormal dermal ridge line direction called a comb type direction pattern. This comb type abnormal dermal ridge line direction is a dermal ridge line direction pattern which is likely to occur near the boundary of the transplanted epidermis when the epidermis and dermis is cut and removed with a scalpel, and a surgical operation such as changing the position and replacement is performed.

FIG. 4B is an example of a dermal fingerprint image having an abnormal dermal ridge line direction called a ω type direction pattern. This ω type abnormal dermal ridge line direction is also a dermal ridge line direction pattern which is likely to occur near the boundary of the transplanted epidermis when the epidermis and dermis is cut and removed with a scalpel, and a surgical operation such as changing the position and replacement is performed. In addition, the ω type direction pattern is a pattern which is likely to occur also when a deep cut reaching the dermis is made to the arch-shaped portion of the fingerprint with a blade or the like.

FIG. 4C is an example of a dermal fingerprint image having an abnormal dermal ridge line direction called an X type direction pattern. This abnormal dermal ridge line direction of the X type is a dermal ridge line direction pattern which is likely to occur in the stitched portion when the skin is tightly stitched with a surgical thread or the like.

Figure 5A:
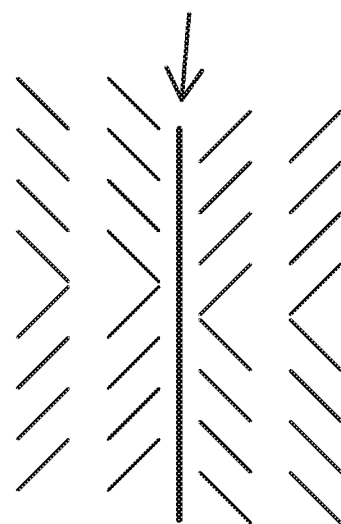
FIG. 5A is a conceptual diagram schematically showing templates corresponding to abnormal dermal ridge line directional patterns in the first exemplary embodiment.
Figure 5B:
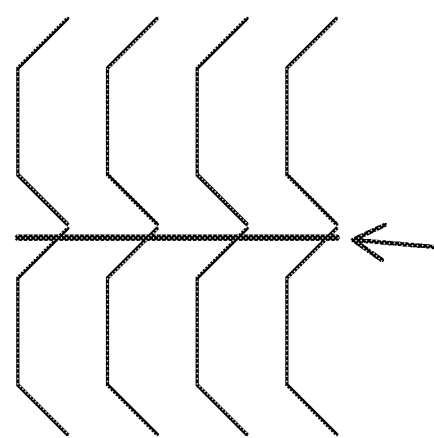
FIG. 5B is a conceptual diagram schematically showing templates corresponding to abnormal dermal ridge line directional patterns in the first exemplary embodiment.
Figure 5C:
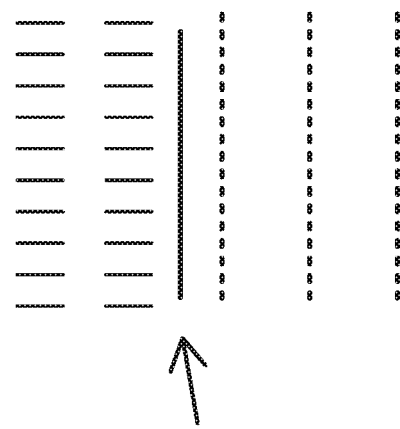
FIG. 5C is a conceptual diagram schematically showing templates corresponding to abnormal dermal ridge line directional patterns in the first exemplary embodiment.

FIG. 5A to FIG. 5C are conceptual diagrams schematically showing templates corresponding to each of the abnormal dermal ridge line direction patterns (comb type, ω type, and X type).

FIG. 5A corresponds to the X type direction pattern in the dermal fingerprint image.

FIG. 5B corresponds to the ω type direction pattern in the dermal fingerprint image.

FIG. 5C corresponds to the comb type direction pattern in the dermal fingerprint image.

The singular region detection unit 61 includes a comb type direction pattern detection unit 75, an ω type direction pattern detection unit 76, and an X type direction pattern detection unit 77 in correspondence with the abnormal direction patterns described above. The singular region detection unit 61 performs processing for detecting these abnormal direction patterns by using information on the dermal ridge line direction and information on the dermal ridge line intensity already detected by the above method.

A processing method for detecting each of the abnormal direction patterns will be described below.

The comb type direction pattern detection unit 75 calculates and outputs the degree indicating the likelihood of the comb type direction pattern of the dermal fingerprint image using the data input of the dermal ridge line direction and the dermal ridge line intensity preliminarily detected based on the given dermal fingerprint image.

Specifically, the comb type direction pattern detection unit 75 preliminarily holds comb type template data representing the direction pattern as shown in FIG. 5C in the internal memory. The comb type template data is data obtained on the basis of a dermal fingerprint image having the comb type direction pattern, and is stored in a two dimensional array corresponding to polar coordinates. "i" which is the first index of comb template data Tk (i, j) which is a two dimensional array, corresponds to the displacement angle around the center of the template data. In this definition "i=1, 2, . . . , M". This "i" is an index value corresponding to each direction when 360 degrees in all directions from the center of the dermal fingerprint image are cut in increments of (360/M) degrees. Where the positive direction of the x-axis of the xy orthogonal coordinate system is 0 degrees, the counterclockwise direction is the positive direction of the displacement angle. Moreover, a second index "j" corresponds to the distance from the center of the dermal fingerprint image. In this definition "j=1, 2, . . . , N". This "j" is an index value corresponding to the distance from the center of the template. The value of each element of Tk (i, j) is a two dimensional vector (unit vector) value representing the dermal ridge line direction in the portion (small region) represented by this polar coordinate.

The comb type direction pattern detection unit 75 calculates the maximum value of the sum of the inner products of the template direction Tk (k, t) and the direction vectors in the dermal ridge line direction within the circle of the image while changing the template rotation angle "t", with respect to an arbitrary pixel position (x, y) in the given dermal fingerprint image. The maximum value is expressed by Ek (x, y) according to the following equation.

$$Ek(x, y) = \max_{t=1,\ldots,M} \left\{ \sum_{i=1}^{N} \frac{Tk(t, i) \cdot Id(x + dx(i), y + dy(i))}{N} \right\}$$ [Equation 1]

In Equation (1) above, Id (x, y) is a unit vector representing the dermal ridge line direction at a coordinates (x, y) of the dermal fingerprint image. Tk (t, i) is the i-th direction of the comb template (rotation angle is t). dx (i) is the x coordinate displacement of the i-th element in the template. dy (i) is the y coordinate displacement of the i-th element in the template.

That is to say, the value of Ek (x, y) calculated by this Equation (1) is a correlation value when correlation between the dermal fingerprint image and the template is the greatest (when t corresponds to such an angle) where the template is rotated 360 degrees at the coordinates (x, y) of the dermal fingerprint image.

Also, at this time, the dermal ridge line direction (displacement angle) is expressed as a numerical value in the range up to 180 degrees in the counterclockwise direction where the X axis positive direction is taken as 0 degree. However, since the 0 degree direction and the 180 degrees direction need to be regarded as substantially the same direction, the inner product is yielded upon converting the angle of the direction vector so that the angle formed thereby with the X axis positive direction (0 degree direction) is doubled.

The value of Ek (x, y) calculated by the Equation (1) above is an index representing the directional consistency between the dermal fingerprint image and the template. Further, the comb type direction pattern detection unit 75 calculates a comb type evaluation value Wk (x, y) multiplied by the dermal ridge line intensity. The dermal ridge line intensity represents dermal fingerprint likeness.

$$Wk(x,y) = \max(0, Ek(x,y) - C) \times Is(x,y)$$ [Equation 2]

In the above equation, C is an appropriately set threshold value. That is to say, the threshold value C has an effect of removing a portion where the value of Ek (x, y) is equal to or less than C as noise. Is (x, y) is an average value of the dermal ridge line intensity within the same radius as the template where the coordinates (x, y) serves as the center.

That is to say, the evaluation value Wk (x, y) is obtained by subtracting the threshold value C from the value of Ek (x, y) (in the case where the result becomes negative, it is set to 0) and further multiplying by the dermal ridge line intensity in the vicinity of the coordinate (x, y).

The comb type direction pattern detection unit 75 outputs this calculated value Wk (x, y) as a comb type abnormality degree (comb type evaluation value). This comb type abnormality degree is a degree indicating the likelihood of a comb type direction pattern.

The ω type direction pattern detection unit 76 preliminarily holds ω type template data representing the direction pattern as shown in FIG. 5B in the internal memory. The data structure of the ω type template data itself is similar to that of the comb type template data. The ω type template data is template data representing a dermal ridge line direction, and is preliminarily created based on an actual dermal fingerprint image having an ω type direction pattern. Based on the given dermal fingerprint image and the ω type template data above, the ω type direction pattern detection unit 76 calculates an ω type abnormality degree Wo (x, y) by using the same procedure as that of the above calculation procedure of the comb type direction pattern detection unit 75.

The X type direction pattern detection unit 77 preliminarily holds X type template data representing the direction pattern as shown in FIG. 5A in the internal memory. The data structure of the X type template data itself is similar to that of the comb type template data. The X type template data is template data representing a dermal ridge line direction, and is preliminarily created based on an actual dermal fingerprint image having an X type direction pattern. Based on the given dermal fingerprint image and the X type template data above, the X type direction pattern detection unit 77 calculates an X type abnormality degree Wo (x, y) by using the same procedure as that of the above calculation procedure of the comb type direction pattern detection unit 75.

The singular region detection unit 61 determines whether or not it is a dermal fingerprint of an abnormal dermal ridge line direction based on whether or not each maximum value of the comb type abnormality degree Wk (x, y) output from the comb type direction pattern detection unit 75, the ω type abnormality degree Wo (x, y) output from the ω type direction pattern detection unit 76, and the X type abnormality degree Wx (x, y) output from the X type direction pattern detection unit 77, exceeds a predetermined threshold. If the value exceeds the threshold value, the singular region detection unit 61 determines that the dermal fingerprint image is a dermal fingerprint of an abnormal dermal ridge line direction (that is to say, corresponds to a comb type direction pattern, an ω type direction pattern, or an X type direction pattern). In other cases, the singular region detection unit 61 determines that it is not a dermal fingerprint of an abnormal dermal ridge line direction.

As another method, the singular region detection unit 61 may determine whether or not it is an abnormal dermal ridge line direction fingerprint based on whether or not the sum of each maximum value of the comb type abnormality degree Wk (x, y) output from the comb type direction pattern detection unit 75, the ω type abnormality degree Wo (x, y) output from the ω type direction pattern detection unit 76, and the X type abnormality degree Wx (x, y) output from the X type direction pattern detection unit 77, exceeds a predetermined threshold. When the value exceeds the threshold value, the singular region detection unit 61 determines that the dermal fingerprint image is a dermal fingerprint of an abnormal dermal ridge line direction. The singular region detection unit 61 determines that it is not a dermal fingerprint of an abnormal dermal ridge line direction in other cases.

That is to say, the singular region detection unit 61 acquires dermal ridge line direction information for each portion included in the dermal fingerprint image. Moreover, the singular region detection unit 61 finds an evaluation value indicating the extent to which the dermal ridge line direction information has an abnormal dermal ridge line direction pattern, based on the correlation between the dermal ridge line direction information, and the template of the abnormal dermal ridge line direction pattern held preliminarily (such as the comb type direction pattern, the ω type direction pattern, and the X type direction pattern). Further, when the evaluation value is equal to or greater than the predetermined threshold value, the singular region detection unit 61 detects a portion corresponding to the dermal ridge line direction information as a singular region.

When it is determined that it is a dermal fingerprint of an abnormal dermal ridge line direction, the singular region detection unit 61 outputs the information on the position of the singular region.

Weighting may be performed with a probability distribution of each evaluation value (comb type abnormality degree, ω type abnormality degree, and X type abnormality degree) based on a database of actual dermal fingerprints. Thereby, the determination accuracy of the singular region detection unit 61 can be further enhanced.

In the present exemplary embodiment, the singular region detection unit 61 includes the comb type direction pattern detection unit 75, the ω type direction pattern detection unit 76, and the X type direction pattern detection unit 77 in the interior thereof, and detects the abnormal dermal ridge line direction corresponding thereto. However, it is not limited to this type of configuration. The configuration may omit some of these.

Conversely, there may be provided templates of other direction patterns to detect abnormal dermal ridge line directions other than these three types. As an example, it is possible to adopt a configuration capable of detecting a pattern slightly changing the dermal ridge line angle of the comb type, the ω type, and the X type, or a configuration capable of detecting several types of patterns as a result of changing the radius of the template.

The above method of detecting a singular region based on the number of directional singular points and the positional relationship between directional singular points, described as "(1) Abnormal Pattern Detection", is an effective technique when a clear image of an entire dermal fingerprint is obtained. On the other hand, in the present method ((2) Abnormal Dermal Ridge Line Direction Detection) that uses evaluation values based on a template, there is an advantage that it enables detection of an abnormal dermal fingerprint of a specific shape even when only an image of only a fraction of the dermal fingerprint is acquired.

((3) Dermal Ridge Line Breakage Detection)

The singular region detection unit 61 also has a function of detecting breakage of a dermal ridge line in the dermal fingerprint. Specifically, the singular region detection unit 61 includes a dermal ridge line breakage detection unit 78.

The singular region detection unit 61 performs processing for detecting these abnormal direction patterns by using information on the dermal ridge line direction and information on the dermal ridge line intensity already detected by the above method.

Figure 6:
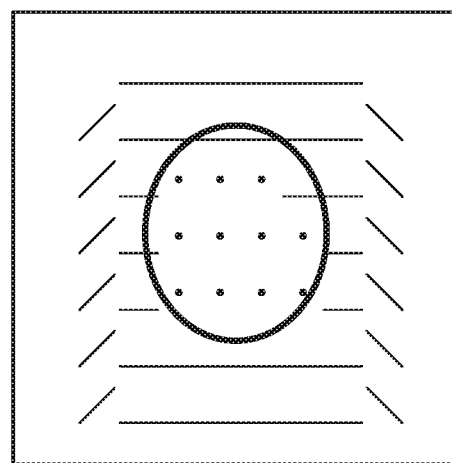
FIG. 6 is a view showing a conceptually illustrated example of a dermal fingerprint image including dermal ridge line breakage in the first exemplary embodiment.
Figure 7:
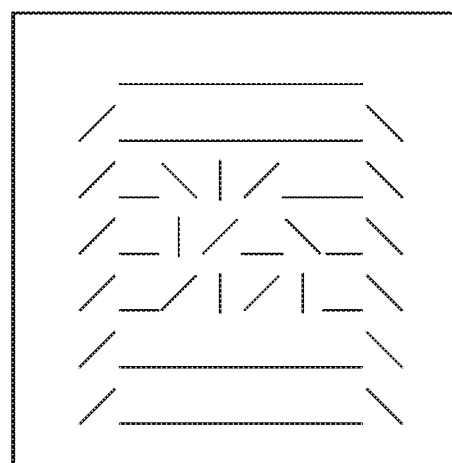
FIG. 7 is a view showing dermal ridge line direction image data obtained for the example of the dermal fingerprint image in FIG. 6, in the first exemplary embodiment.

FIG. 6 is an example conceptually showing a dermal fingerprint image including dermal ridge line breakage. In the example of the dermal fingerprint image shown in FIG. 7, a part of the dermal ridge lines which were originally continuous is discontinuous, and there is a dotted pattern in that part. In FIG. 7, a portion indicated by an elliptical frame is a portion that includes dermal ridge line breakage. This type of dermal ridge line breakage can be caused by burns that reach to the dermis, or damage due to chemicals reaching to the dermis.

The dermal ridge line breakage detection unit 78 acquires the data of the dermal ridge line direction image acquired by the above-described method. This dermal ridge line direction image data includes dermal ridge line direction data at each pixel. Then, the dermal ridge line breakage detection unit 78 executes a direction smoothing process over a large area. This direction smoothing process is a process of correcting a portion in the dermal fingerprint image including the dermal ridge line direction detected in error due to noise or the like, to the correct dermal ridge line direction. The direction smoothing processing itself can be realized by statistical processing on pixel values of dermal ridge line direction image data. The direction smoothing process is, for example, a process of taking a mode value of a direction component of a region within a certain range, or an average of direction vectors of a region within a certain range.

Figure 8:
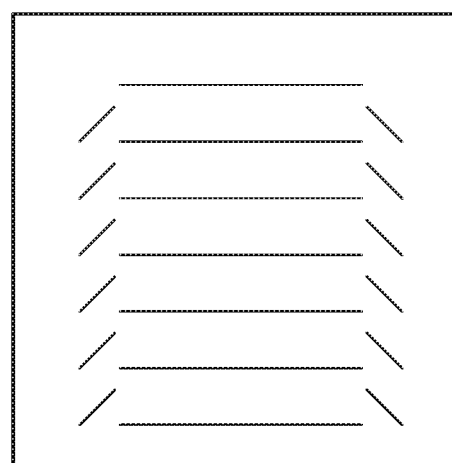
FIG. 8 is a view showing an image obtained as a result of performing a direction smoothing process on the dermal ridge line direction image in FIG. 7, in the first exemplary embodiment.

FIG. 7 and FIG. 8 are schematic diagrams for illustrating examples of the direction smoothing processing mentioned above. FIG. 7 shows for example dermal ridge line direction image data obtained for the example for the dermal fingerprint image in FIG. 6. In FIG. 6, the dermal ridge line direction is indefinite with respect to the portion where the dermal ridge line is broken. The dermal ridge line direction image data for this type of portion is susceptible to noise. This is because the direction of the dermal ridge line to be detected is not stable. Therefore, in the central portion in FIG. 7, the dermal ridge line direction is not constant but random. FIG. 8 is an image obtained as a result of the direction smoothing process performed on the dermal ridge line direction image in FIG. 7. By executing the direction smoothing process by means of the dermal ridge line breakage detection unit 78 over a large area, it is possible to obtain the smoothly changing direction image shown in FIG. 8.

Then, the dermal ridge line breakage detection unit 78 obtains an angular difference between the initial dermal ridge line direction and the post-smoothing dermal ridge line direction, for each portion in the direction image. When the angle (direction) has changed by a predetermined amount or more, that is, when the absolute value of the angular difference is equal to or greater than the predetermined amount, the dermal ridge line breakage detection unit 78 extracts this portion as a dermal ridge line breakage candidate region. With fingerprints of the epidermis, wrinkles and scars of elderly people or the like have thin linear shapes, and these can become ridge line breakage candidate regions. In contrast, the papillary layer is not affected by wrinkles. Moreover regarding scratches, normally these do not reach the dermis, and hence have no affect.

Then, the dermal ridge line breakage detection unit 78 finally calculates the total sum of the dermal ridge line intensity already obtained by the above-described processing for this dermal ridge line breakage candidate region, thereby calculating and outputting an evaluation value for the dermal ridge line breakage detection. Then, when the evaluation value of the dermal ridge line breakage output by the dermal ridge line breakage detection unit 78 is equal to or greater than a predetermined threshold value, the singular region detection unit 61 determines the dermal fingerprint as having a dermal ridge line breakage trace therein. In other cases, the singular region detection unit 61 determines the dermal fingerprint as being a dermal fingerprint having no dermal ridge line breakage trace.

That is to say, the singular region detection unit 61 acquires dermal ridge line direction information for each portion included in the dermal fingerprint image. In addition, the singular region detection unit 61 obtains smoothed dermal ridge line direction information by performing direction smoothing processing based on dermal ridge line direction information of a portion around each portion of the dermal ridge line direction information. Furthermore, when (the absolute value of) the difference between the dermal ridge line direction information and the smoothed dermal ridge line direction information is greater than a predetermined threshold value, the singular region detection unit 61 detects a region corresponding to that portion as the singular region.

When it is determined as being a dermal fingerprint having a dermal ridge line breakage trace therein, the singular region detection unit 61 outputs the information on the position of the singular region.

Among dermal ridge line breakages, there are not only the cases of burns and chemicals, but also cases of dermal ridge line breakage due to years of aging deterioration and engaging in manual labor which abuses the hands. In the case of this type of natural breakage, not only a specific part but also the entire dermal ridge line of the dermal fingerprint is broken. In order to distinguish between this type of natural breakage of the entire dermal ridge line and partial breakage (including intentional breakage) due to burns and chemicals, the singular region detection unit 61 may determine whether or not a portion of the dermal fingerprint other than the dermal ridge line breakage candidate region has a high-quality dermal ridge line image. As a result, it becomes possible to detect only dermal ridge line breakage due to a specific condition.

The singular region detection unit 61 may also determine whether or not a dermal ridge line breakage trace is present in the central portion of the dermal fingerprint. Since the dermal fingerprint central portion has a significant influence on the determination of the fingerprint collation using the dermal fingerprint, dermal ridge line breakage may be intentionally made in some cases. As a result, it also becomes possible to detect only dermal ridge line breakage in a specific location.

((4) Cutout Work Detection)

The singular region detection unit 61 also has a function of detecting cutout work processing of the dermal fingerprint. Specifically, the singular region detection unit 61 includes a cutout work detection unit 79. As will be described below, the cutout work detection unit 79 determines the presence or absence of cutout work processing with respect to the input dermal fingerprint image, based on the change in the dermal ridge line pitch. This is because, in the case of a dermal fingerprint with cutout work having been surgically done thereto, since the skin around the surgical operation mark is pulled while being sutured, the pitch of a specific portion of the dermal ridge line and the pitch of the dermal ridge line in a specific direction locally change.

Figure 9:
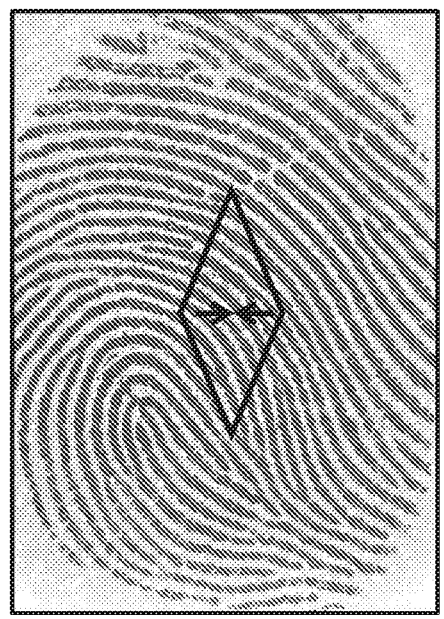
FIG. 9 is a diagram showing an example of a dermal fingerprint image before clipping processing, in the first exemplary embodiment.
Figure 10:
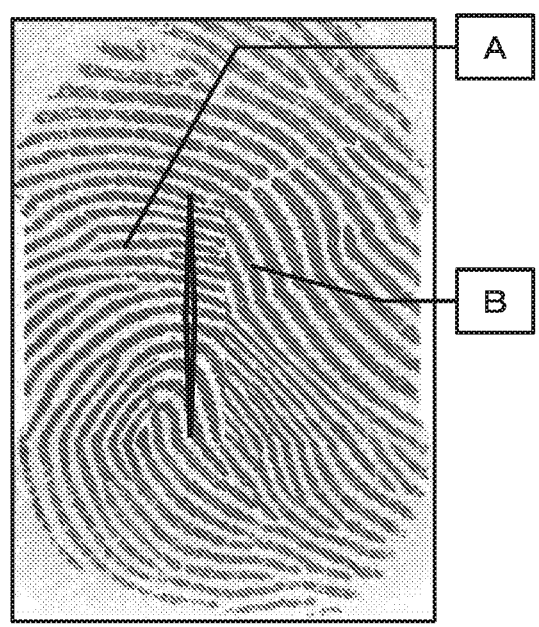
FIG. 10 is a view showing an example of a dermal fingerprint image after cutting out the dermal fingerprint shown in FIG. 9, in the first exemplary embodiment.

FIG. 9 and FIG. 10 are schematic diagrams for explaining the cutout work processing of dermal fingerprints. FIG. 9 shows an example of a dermal fingerprint image before the cutout work is performed. Further, FIG. 10 shows an example of a dermal fingerprint image after the cutout work has been performed on the dermal fingerprint shown in FIG. 9. An example of cutout work by surgery is a method such that a scalpel is placed in the diamond-shaped portion shown in the center of the dermal fingerprint in FIG. 9, the epidermis and dermis is cut out thereinside, and while pulling the skin in the lateral direction, that is, in the left-right direction in a manner of closing the cut-out diamond shape, the center part of the original diamond shape is sutured.

In the case of performing a cutout work operation to achieve deformation on a dermal fingerprint shown in FIG. 10, the dermal ridge line, on the left hand side of FIG. 10, in the direction orthogonal to the cutout direction (that is, the dermal ridge line running in the left-right direction in the present example. The portion indicated by "A" in FIG. 10) does not receive any change as a result of pulling. On the other hand, the dermal ridge line, on the right hand side of FIG. 10, in the direction parallel to the cutout direction (that is, the dermal ridge running in the vertical direction in this example. The portion indicated by "B" in FIG. 10) is observed with a characteristic in which the dermal ridge line pitch spreads more than the original pitch.

A method of detection processing performed by the cutout work detection unit 79 is as follows.

The cutout work detection unit 79 first detects the scar position on which the cutout work has been performed. Specifically, a line segment of a certain length at an arbitrary angle from an arbitrary pixel in the image is generated, and the dermal ridge line direction difference and the dermal ridge line pitch difference are added for the image portion within a certain distance range (1 to 16 pixels) from line segments on both sides of the line segment. The coordinates (x, y) and angle (t) at which the sum value is a maximum are taken as a candidate for the scar position.

Next, the cutout work detection unit 79 calculates two types of cutout work evaluation values for rectangular regions (region R1 and region R2, respectively) of a predetermined size on both sides of the scar. The first evaluation value Wc1 is an index for seeing whether or not the dermal ridge line pitch in the same direction as the scar is widening. The second evaluation value Wc2 is an index for seeing whether or not the dermal ridge line pitches are different on both sides of the scar. The cutout work detection unit 79 calculates Wc1 and Wc2 by the following equations.

$$Wc1 = \max_{R=R1,R2} \left\{ \left( \frac{90 - \text{Angle difference between average direction within } R \text{ and } t}{(90)} \right) \times \right.$$

$$\left. \max\left(0, \frac{\text{Average pitch within } R - \text{Fingerprint average pitch}}{\text{Fingerprint average pitch}}\right) \times \right.$$

$$\left. \text{Average intensity within } R \right\} \quad \text{[Equation 3]}$$

$$Wc2 = \frac{\left| \text{Average pitch within } R1 - \text{Average pitch within } R2 \right|}{\text{Fingerprint average pitch}} \times$$

$$\min(\text{Average intensity within } R1, \text{Average intensity within } R2) \quad \text{[Equation 4]}$$

That is to say, for each of the regions R1 and R2, when a product of a degree to which the dermal ridge line direction in the region coincides with "t", a degree to which the dermal ridge line pitch in the region is wider than the dermal ridge line pitch of the entire dermal fingerprint (0 when it is narrower than the dermal ridge line pitch of the entire dermal fingerprint), and the dermal ridge line intensity in the region is obtained, the greater value is the evaluation value Wc1.

Further, the evaluation value Wc2 is the product of the degree of the difference between the dermal ridge line pitches in the regions R1 and R2 and the dermal ridge line intensity (the smaller one of the regions R1 and R2).

The average direction in the above equation is calculated by taking a weighted average with respect to the direction data generated by the dermal ridge line direction detection unit 70 using weighting based on the dermal ridge line intensity generated by the dermal ridge line intensity detection unit 72. The average pitch in the above equation is calculated by taking a weighted average with respect to the pitch data generated by the dermal ridge line pitch detection unit 71 using weighting based on the dermal ridge line intensity generated by the dermal ridge line intensity detection unit 72.

The determination by means of the evaluation values Wc1 and Wc2 calculated by the cutout work detection unit 79 is effective when the scar position is correctly detected. However, depending on the dermal fingerprints, there are some cases where the position of the cutout work is unclear and the scar position cannot be clearly known. In order to cope with these types of cases, a method of detecting whether or not an unnatural broad pitch portion exists in the entire dermal fingerprint is used concurrently, without using the scar position detected by the cutout work detection unit 79. Therefore, the following evaluation values Wc3 and Wc4 are used as indices. The evaluation value Wc3 is an index for seeing whether or not an abnormal wide pitch portion exists. The evaluation value Wc4 is an index for seeing whether or not the pitch in a specific direction is widening. The cutout work detection unit 79 calculates Wc3 and Wc4 by the following equations.

$$Wc3 = \frac{\text{Total sum of ridge line intensities of 1.5 or more times fingerprint average pitch}}{\text{Total sum of ridge line intensities of entire fingerprint}}$$ [Equation 5]

$$Wc4 = \frac{\text{Average pitch of direction } Dm \times \text{average intensity of direction } Dm}{\text{Average pitch} \times \text{average intensity}}$$ [Equation 6]

In the equation of Wc4, Dm is a direction in which the average pitch is the maximum.

That is to say, the evaluation value Wc3 represents the ratio of the portion of the entire dermal fingerprint where the dermal ridge line pitch is wide (based on the pitch 1.5 times the average of the entire dermal fingerprint), and is the value of the ratio with the dermal ridge line intensities being taking into account.

The evaluation value Wc4 represents the ratio of the width of the pitch in the direction of a specific dermal ridge line (the direction in which the average pitch is the maximum) of the entire dermal fingerprint, and is the value of the ratio with the dermal ridge line intensities being taking into account. Magnification 1.5 is an example of the reference.

Finally, the cutout work detection unit 79 outputs the above-described four types of evaluation values Wc1, Wc2, Wc3, and Wc4. Then, the singular region detection unit 61 determines whether or not cutout work is included in the dermal fingerprint image, depending on whether or not the respective values of the evaluation values Wc1, Wc2, Wc3, and Wc4 are equal to or greater than a predetermined threshold value. In addition, the singular region detection unit 61 multiplies each of these evaluation values Wc1, Wc2, Wc3, and Wc4 by a predetermined weight to obtain a weighted average (weighted mean), and it is determined whether or not cutout work is included in the dermal fingerprint image depending on whether or not the weighted average is equal to or greater than the predetermined threshold value.

That is to say, the singular region detection unit 61 acquires dermal ridge line direction information as well as dermal ridge line pitch information for each portion included in the dermal fingerprint image. Moreover, the singular region detection unit 61 finds an evaluation value which takes a greater value as the difference in the dermal ridge line direction and the difference in the dermal ridge line pitch become greater between adjacent regions in the dermal fingerprint image, based on the dermal ridge line direction information and the dermal ridge line pitch information. Further, when the evaluation value is greater than the predetermined threshold value, the singular region detection unit 61 detects that the adjacent region is a singular region due to cutout work.

When it is determined as being a dermal fingerprint with cutout work done therein, the singular region detection unit 61 outputs the information on the position of the singular region.

Generally, in normal dermal fingerprints, it is known that the pitch of the dermal ridge line in the horizontal direction (short side direction of the finger) in the vicinity of the end of the lower part of the dermal fingerprint tends to be wider than the dermal ridge line pitch in the other portions. Based on this, in the processing described above, the region in the lower part of the dermal fingerprint in which the dermal ridge line is in the horizontal direction may be excluded from the calculation of the evaluation values Wc1, Wc2, Wc3, and Wc4. By performing the calculation of the evaluation values by the cutout work detection unit 79 in this manner, it is possible to further enhance the determination accuracy.

For example, in a situation such as a criminal investigation, in a case where a person from whom a fingerprint is to be collected does not wish to authenticate themselves, the fingerprint is impressed while being intentionally twisted in some cases. Even in such a case, there is a tendency for the specific region of the fingerprint and the pitch in the specific direction to widen by pulling as a result of twisting. Similarly, it is considered that the dermal fingerprint also widens the specific region and the pitch in the specific direction. The evaluation values Wc3 and Wc4 that do not use the scar position can also be used for the purpose of detecting a dermal fingerprint impressed in a state unsuitable for authentication where an action such as twisting is applied.

As described above, based on the image information of the papillary layer acquired by the dermal image information acquisition unit 11, the singular region detection unit 61 detects a singular region indicating damage of the papillary layer.

As a result, the singular region detection unit 61 can determine the presence or absence of the singular region with high accuracy even when the state of the skin is not good, such as in the case where the fingerprint is unclear due to roughness, wrinkles due to aging and the like, or burns. Thereby, the dermal image information processing device 3 can reduce the possibility that the existence of the singular region is missed and the same person is erroneously determined as a different person.

Further, the singular region detection unit 61 detects the directional singular point of the dermal ridge line included in the image of the papillary layer, and detects the singular region based on the condition of the number of each type of directional singular point or the condition of the positional relationship between the types of directional singular points.

As a result, the singular region detection unit 61 can detect a case where the number or the positional relationship is abnormal even if the pattern can exist in the dermal fingerprint image. In this respect, the singular region detection unit 61 can detect an abnormality of the dermal fingerprint image with high accuracy.

Further, the singular region detection unit 61 acquires the dermal ridge line direction information for each portion included in the image of the papillary layer. At the same time, based on the correlation between the dermal ridge line direction information and the template of the abnormal dermal ridge line direction pattern held preliminarily, the singular region detection unit 61 finds an evaluation value representing the degree of abnormal dermal ridge line directional pattern possession in the dermal ridge line direction information. When the evaluation value is equal to or greater than a predetermined threshold value, the singular region detection unit 61 detects a portion corresponding to the dermal ridge line direction information as a singular region.

As a result, the singular region detection unit 61 can detect with high accuracy, a typical pattern in a singular region such as a dermal ridge line direction which is likely to occur when the dermal fingerprint is changed for example by surgery, by using a template. In particular, the singular region detection unit 61 can detect an abnormal dermal fingerprint of a specific shape even when only a partial image of the dermal fingerprint is taken.

In addition, the singular region detection unit 61 acquires the dermal ridge line direction information for each portion included in the image of the papillary layer, and also acquires smoothed dermal ridge line direction information that has been smoothed by direction smoothing processing based on dermal ridge line direction information of the portion around the relevant portion for each portion of the dermal ridge line direction information. When the difference between the dermal ridge line direction information and the smoothed dermal ridge line direction information is greater than a predetermined threshold value, the singular region detection unit 61 detects the region corresponding to that portion as a singular region.

As a result, the singular region detection unit 61 can detect the singular region even for example when a ridge line of the dermis such as a burn reaching the dermis is not clear.

Further, the singular region detection unit 61 acquires dermal ridge line direction information and dermal ridge line pitch information for each portion included in the image of the papillary layer. At the same time, the singular region detection unit 61 finds an evaluation value which takes a greater value as the difference in the dermal ridge line direction and the difference in the dermal ridge line pitch become greater between adjacent regions in the image of the papillary layer, based on the dermal ridge line direction information and the dermal ridge line pitch information. Then, when the evaluation value is greater than the predetermined threshold value, the singular region detection unit 61 detects that the adjacent region is a singular region due to cutout work.

As a result, the singular region detection unit 61 can detect the singular region even when the scratch position is not clearly known.

In addition, the collation unit 116 performs a collation process on the dermal image information of the dermal image information acquired by the dermal image information acquisition unit 11 that is in a region other than the singular region detected by the singular region detection unit 61, and the preliminary registration information being dermal image information registered in advance in association with identifying information for identifying the individual.

Thus, even when a singular region is included in the dermal image, the collation unit 116 can prevent erroneously determining the same person as a different person due to the difference in the dermal fingerprint in the singular region.

In addition, when performing the collation processing, the collation unit 116 makes at least either one of a positional deviation allowance which represents a degree to which positional deviation is allowed, and a mismatch allowance which represents a degree to which a mismatch is allowed, variable.

In particular, by increasing at least one of the positional deviation allowance and the mismatch allowance, the collation unit 116 can reduce the possibility of erroneously determining the same person as a different person.

In a fingerprint that is damaged due to a surgical operation or an injury, the region except for the portion of the surgical operation or injury maintains the characteristic amount of the original fingerprint. By verifying the consistency of this portion, there is a possibility that it can be collated with the fingerprint before the surgical operation or injury. Similarly for the dermal fingerprint, except for the portion of the surgical operation or injury, there is a possibility that it can be collated with dermal fingerprints or fingerprints before surgery or injury.

On the other hand, in characteristic point collation, whether or not the same fingerprint is present is determined by checking whether adjacent characteristic points (dermal ridge line end points and/or branch points) of the fingerprint are at a certain distance difference or a certain angular difference. In the case of surgically operated fingerprints, in many cases, this allowance is exceeded by shape change due to pulling at the time of suturing.

Therefore, for a fingerprint judged to be a damaged fingerprint, by mitigating the positional deviation allowance or mismatching allowance of fingerprint characteristics at the time of collation from a standard value, it is possible to manufacture a device that is characterized by being capable of collating with the finger of the principal person before the damage was made thereto.

When mitigating collation allowance, there is a disadvantage that the risk of erroneously identifying a different person as the principal person increases. However, in the operational environment in which an operator or the like ultimately confirms whether he/she is the same person or not using a face photograph or the like other than the fingerprint, it is possible to reduce this type of risk of misidentifying another person.

With the above-described configuration, the dermal image information processing device 3 can perform collation processing according to the presence or absence of a singular region, based on the information acquired by the singular region detection result acquisition unit 12. In addition, it is possible to perform collation processing according to the position of the singular region.

Second Exemplary Embodiment

Next, a second exemplary embodiment will be described. Descriptions of matters common to those of the previously described exemplary embodiment may be omitted, and the following description focuses on matters unique to the second exemplary embodiment.

Figure 11:
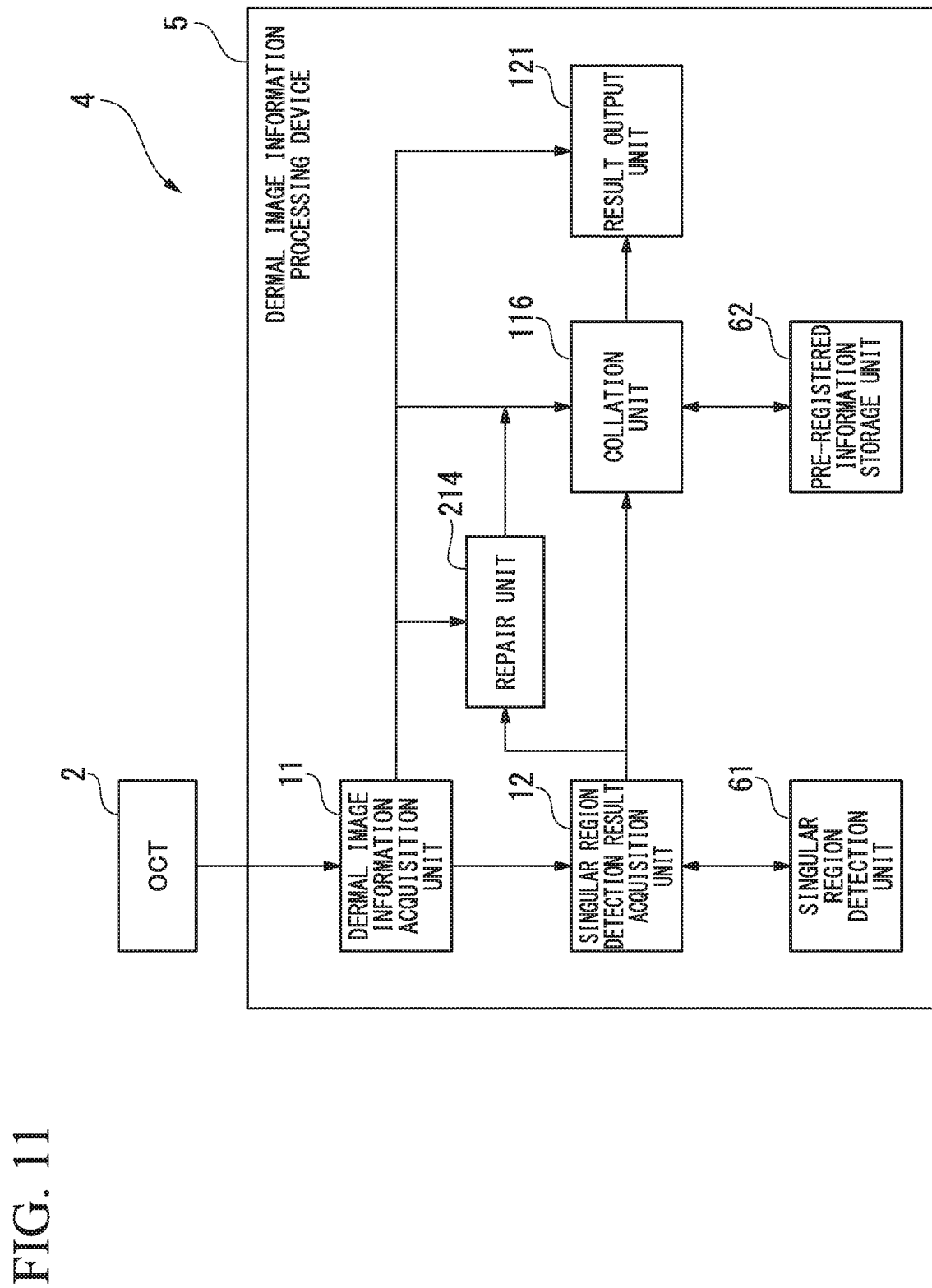
FIG. 11 is a schematic block diagram showing a functional configuration of an image information processing system according to a second exemplary embodiment of the present invention.

FIG. 11 is a schematic block diagram showing a functional configuration of an image information processing system according to the second exemplary embodiment. As shown in FIG. 11, an image information processing system 4 includes an OCT 2, and a dermal image information processing device 5. The dermal image information processing device 3 includes a dermal image information acquisition unit 11, a singular region detection result acquisition unit 12, a singular region detection unit 61, a pre-registered information storage unit 62, a collation unit 116, a result output unit 121, and a repair unit 214.

The singular region detection unit 61 and the pre-registered information storage unit 62 may be realized as functions of independent devices or may be realized as functions of a part of other devices. Either one or both of the singular region detection unit 61 and the pre-registered information storage unit 62 may be realized as the internal function of the dermal image information processing device 3. The OCT 2 and the dermal image information processing device 3 may be integrally configured. For example, the computer of the OCT 2 may execute the function of the dermal image information processing device 3.

Each of the dermal image information acquisition unit 11, the singular region detection result acquisition unit 12, the collation unit 116, and the result output unit 121 has the same function as each function in the first exemplary embodiment. The dermal image information processing device 5 according to the second exemplary embodiment includes a repair unit 214.

The repair unit 214 repairs the damage of the dermal image generated in the singular region of the dermal image including the singular region among the dermal image information acquired by the dermal image information acquisition unit 11.

The collation unit 116 in the second exemplary embodiment regards the dermal image information restored by the repair unit 214 as a region other than the singular region, and performs collation processing.

Next, details of the process performed by the repair unit 214 will be described. The repair unit 214 performs the process of repairing the dermal fingerprint of the singular region caused by a surgical operation called "Z type surgery". The Z type surgery is a surgical operation in which a scalpel is inserted in a Z shape into the epidermis and dermis, and the skin (epidermis and dermis) of the two triangular portions created as a result of the Z-shaped incision is replaced and then sutured again. When such surgery is performed, a positional change of the characteristic amount of the dermal fingerprint occurs, so that it is difficult or impossible to collate as it is with the dermal fingerprint before the surgery.

Figure 12:
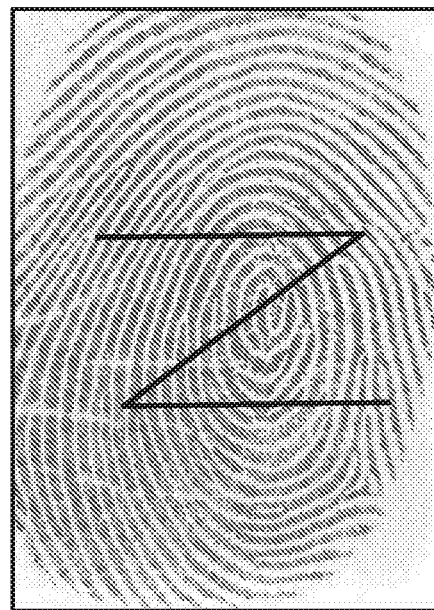
FIG. 12 is a view showing an image before applying Z-type surgery, in the second exemplary embodiment.
Figure 13:
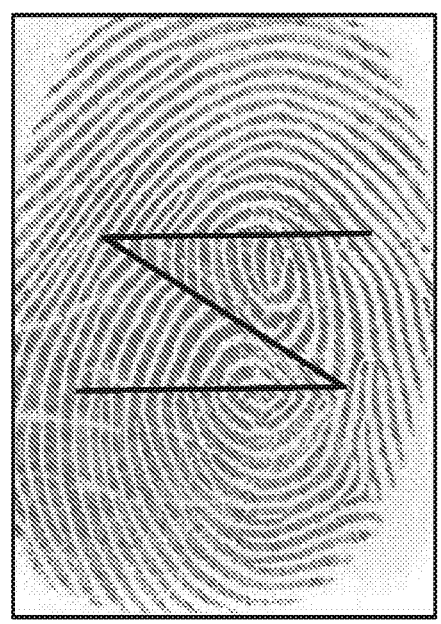
FIG. 13 is a view showing an image after performing Z-type surgery, in the second exemplary embodiment.

FIG. 12 and FIG. 13 are schematic diagrams showing examples of dermal fingerprint images for explaining Z-type surgery. FIG. 12 shows an image before performing the Z type surgery. FIG. 13 shows an image after performing the Z-type surgery. By replacing and suturing the two triangular skins created as a result of the Z-shaped incision described above, the dermal fingerprint image shown in FIG. 13 has a pattern which is not normally possible.

The dermal fingerprint image shown in FIG. 13 is an abnormal dermal fingerprint. The repair unit 214 repairs the dermal fingerprint image shown in FIG. 13 created as a result of the Z type surgery, that is to say, performs a process for processing the image, and performs a process for restoring it to the original dermal fingerprint image (before the surgery) in FIG. 12.

Figure 14:
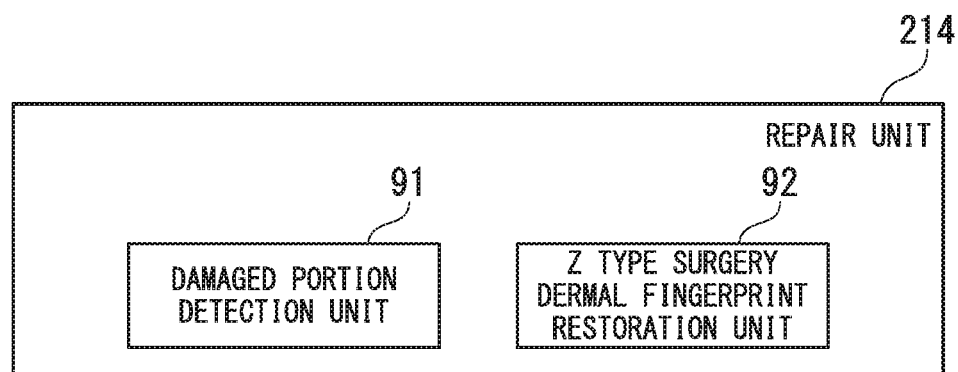
FIG. 14 is a block diagram showing a schematic functional configuration inside a repair unit, in the second exemplary embodiment.

FIG. 14 is a block diagram showing a schematic functional configuration inside the repair unit 214. As shown in FIG. 14, the repair unit 214 includes thereinside a damaged portion detection unit 91 and a Z type surgery dermal fingerprint restoration unit 92.

Hereinafter, a method of processing performed by the repair unit 214 will be described.

The damaged portion detection unit 91 detects a portion of the trace on which the operation has been performed from the dermal fingerprint image, and outputs an abnormality degree image representing the degree of abnormality as an image. As an example, in the abnormality degree image, the degree of abnormality is represented in grayscale in the image.

As the degree of abnormality, the damaged portion detection unit 91 uses any one of a comb type evaluation value (comb type abnormality) Wk (x, y), an ω type evaluation value (ω type abnormality) Wo (x, y), and an X type evaluation value (X type abnormality) Wx (X, y) calculated by the aforementioned singular region detection unit 61. The damaged portion detection unit 91 may receive these various evaluation values from the singular region detection unit 61, or the damaged portion detection unit 91 itself may calculate these various evaluation values by means of a similar method. In addition, the damaged portion detection unit 91 may use another evaluation value (for example, a value indicating the degree of direction change or pitch change as described above) as the degree of abnormality. The damaged portion detection unit 91 may use a weighted average value obtained by weighting these various evaluation values and taking the average as the abnormality degree. Then, the damaged portion detection unit 91 creates an abnormality degree image using one of the abnormality degrees described here.

The Z type surgery dermal fingerprint restoration unit 92 receives input of two images of a dermal fingerprint image and an abnormality level image created by the damaged portion detection unit 91, and outputs a processed dermal fingerprint restored image.

Specifically, first, the Z type surgery dermal fingerprint restoration unit 92 is a processing unit that performs a process of detecting a linear component from the abnormality degree image, and can be configured by applying Hough transformation to the abnormality degree image. As a result of this Hough transformation, the Z type surgery dermal fingerprint restoration unit 92 detects straight line components in the abnormality degree image. Then, the Z type surgery dermal fingerprint restoration unit 92 detects three straight line components (from the first candidate up to the third candidate) in which the portions with high abnormality degrees (dark portions in the case where it is expressed as an abnormality degree grayscale image) are linearly arranged. When these three straight line components from the first candidate to the third candidate form a "Z" shape on the dermal fingerprint, the Z type surgery dermal fingerprint restoration unit 92 determines that the dermal fingerprint has undergone the Z shape processing.

In order to determine whether or not the three straight line components from the first candidate to the third candidate form a "Z" shape, the Z type surgery dermal fingerprint restoration unit 92 uses the following conditions (1) to (3). The condition for determining a "Z" shape is that all of the following conditions (1) to (3) are satisfied. A provision is that in the condition (1) to the condition (3), the three straight line components that are the first candidate to the third candidate are represented by straight lines (line segments) A, B, and C.

Condition (1): Two straight lines A and B the orientation (angle) of which are closest to each other are near parallel. Specifically, the difference between the orientations of the straight line A and the straight line B is within 15 degrees, and also the straight lines A and B do not intersect within the image range. The above-mentioned 15 degrees is an example of a value.

Condition (2): A straight line C other than A and B intersects each of the straight lines A and B in the image range at a difference of orientation (angle) of not less than 20 degrees and not more than 60 degrees.

Condition (3): The average value of the pixel values of the abnormality degree images on the straight lines (line segments) A, B, and C is equal to or greater than a predetermined threshold value for each line segment (for all three lines).

Figure 15:
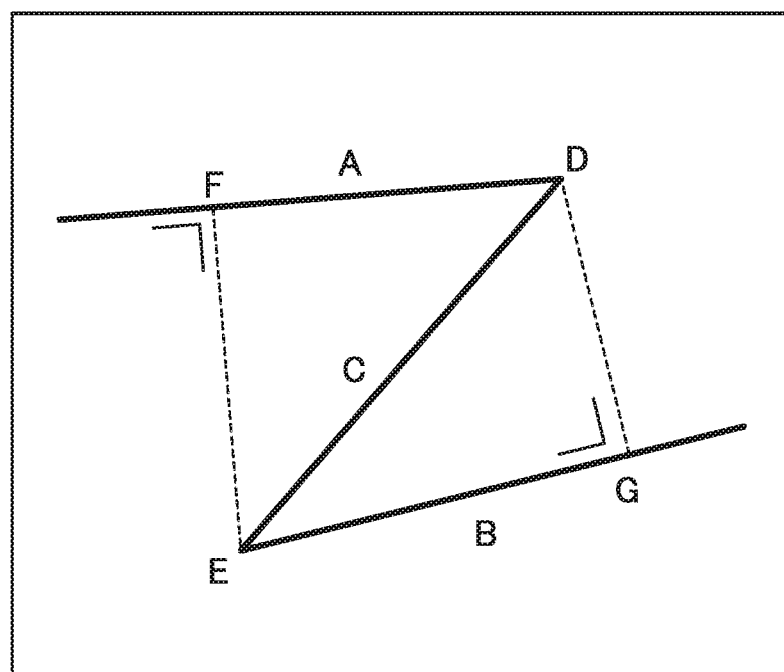
FIG. 15 is a schematic diagram for explaining a method of Z-type surgical dermal fingerprint restoration, in the second exemplary embodiment.

FIG. 15 is a schematic diagram for explaining the method of restoring a Z type surgery dermal fingerprint. When it is determined that the input dermal fingerprint image is a Z type surgery dermal fingerprint, the Z type surgery dermal fingerprint restoration unit 92 restores the preoperative image by the following method (Step (1) to Step (6)), and outputs the obtained preoperative image. FIG. 15 shows three straight line component candidates (straight lines A, B, C) in the abnormal value image detected at the time of the above determination. Moreover, FIG. 15 shows points D, E, F, and G used in the restoration procedure described below.

Step (1): The point of intersection between the straight line A and the straight line C is taken as D, and the intersection between the straight line C and the straight line B is taken as E.

Step (2): The foot of the perpendicular drawn from the intersection point E onto the straight line A (the intersection between the perpendicular line and the straight line A) is taken as F.

Step (3): The foot of the perpendicular drawn from the intersection point D onto the straight line B (the intersection between the perpendicular line and the straight line B) is taken as G.

Step (4): Copy the portion surrounded by the triangle FDE (first polygon) of the input image onto the triangle FGE of the output image by means of affine transformation.

Step (5): Copy the portion surrounded by the triangle DEG (second polygon) of the input image onto the triangle DFG of the output image by means of affine transformation.

Step (6): The regions other than the portions copied in the Steps (4) and (5) above are directly copied from the input image to the output image.

That is to say, based on the correlation between the dermal ridge line direction information of each portion included in the dermal fingerprint image and the template of the abnormal dermal ridge line direction pattern held preliminarily, the repair unit 214 finds an evaluation value representing the degree of abnormal dermal ridge line directional pattern possession in the dermal ridge line direction information for each of the portions, and extracts the straight line component of the evaluation value in the dermal fingerprint image. In addition, the repair unit 214 mutually replaces the dermal fingerprint images included in the first polygon and the second polygon defined based on these straight line components (if the shape of the polygon to be replaced differs from the shape of the original polygon, the shape is appropriately adjusted by means of affine transformation or the like) to thereby repair the damage.

Although the points F and G used in the above method are not necessarily guaranteed to be completely identical with the cutout part in the actual surgical operation, the characteristic amounts of the dermal fingerprint images on the two triangles FGE and DFG used in the above Steps (4) and (5) can be expected to approach the position of the dermal fingerprint before the surgical operation. That is to say, the repairing process of the repair unit 214 increases the possibility of successful collation with the pre-registered information in the collation unit 116.

Further, in the case of handling a surgical dermal fingerprint (postoperative dermal fingerprint) with a portion that has been clearly processed, by performing image matching (dermal ridge line matching) at the boundary between the line segment DF and the line segment DE of the transformed portion, the repair unit 214 may correct the coordinate position of the point F which is the starting point F of the processing. Similarly, by performing image matching at the boundary between the line segment EG and the line segment ED of the transformed portion, the coordinate position of the point G serving as the starting point of processing may be corrected.

Modified Example 1 of Repair Unit

The process of the repair unit 214 may be performed in a manner of the following modified example.

Here is described a case where the input dermal fingerprint image is determined as containing cutout work damage, based on the evaluation values Wc1 and Wc2 calculated by the above-described cutout work detection unit 79. In this case, the repair unit 214 detects a rectangular region having a wide pitch on the wide pitch side of the detected scar, calculates the product of the region width and the pitch change difference in the rectangle, and estimates that it is the width of the cutout portion. As a result, it is possible to restore the peripheral portion of the fingerprint outside the diamond shape by performing image transformation such that the diamond region at the center part of FIG. 9 is inserted as a blank portion into the detection rectangular region of the image in FIG. 10.

Modified Example 2 of Repair Unit

As a further modification of the repair unit 214, a repair unit 214a described below may be used. The repair unit 214a according to the present modified example does not restore the dermal fingerprint before surgery by means of transformation, but excludes the portion where the dermal fingerprint has been processed, extracts only the portion that has not been processed, and outputs the extracted result as a restored image. That is to say, the repair unit 214a cuts out a portion which has not been processed by means of surgery or the like.

Figure 16:
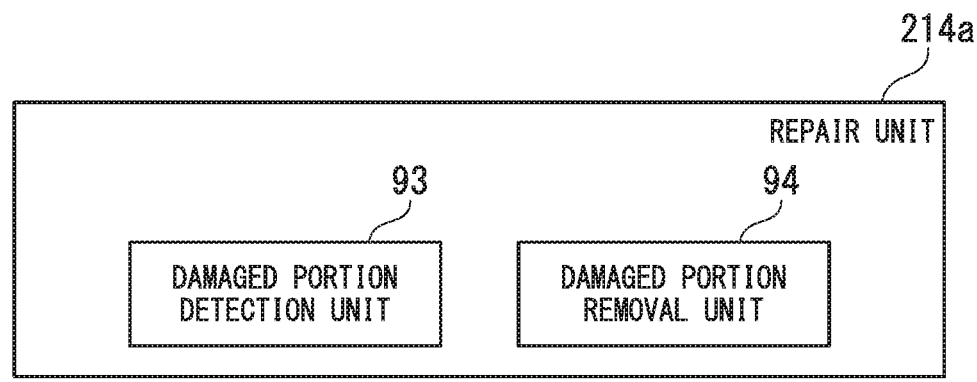
FIG. 16 is a block diagram showing a schematic functional configuration of a repair unit according to a modification of the second exemplary embodiment.
Figure 17:
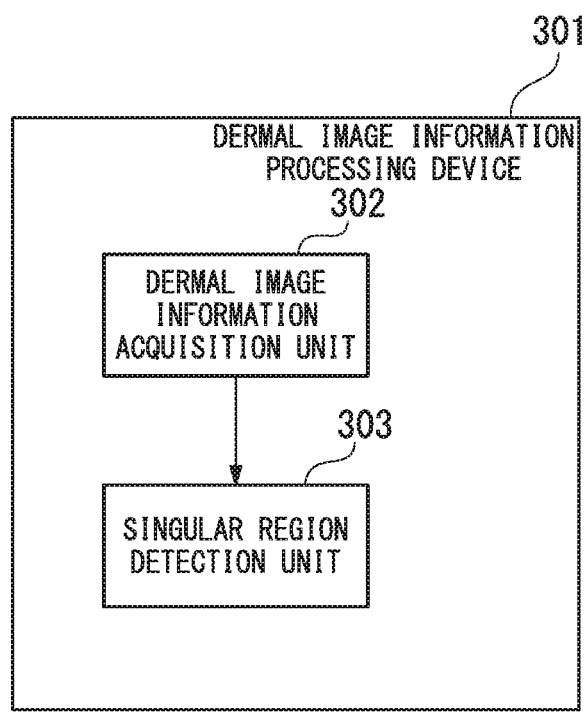
FIG. 17 is a schematic block diagram showing a configuration of a dermal image information processing device according to a third exemplary embodiment of the present invention.

FIG. 16 is a block diagram showing a schematic functional configuration of the repair unit 214a according to present modified example. As shown in FIG. 17, the repair unit 214a according to the present modified example includes a damaged portion detection unit 93 and a damaged portion removal unit 94.

An example of the function of the damaged portion detection unit 93 is similar to the function of the damaged portion detection unit 91 described above. The damaged portion detection unit 93 may further include a function of detecting an abnormal wide pitch area or a function of detecting a dermal ridge line damage region (a function similar to the above-described dermal ridge line breakage detection unit 78). As a result, it is possible to detect a damaged portion while taking the information of the abnormality degree image into account.

Based on the abnormality degree image generated by the damaged portion detection unit 93, the damaged portion removal unit 94 decides an exclusion region to be excluded as a damaged portion by means of any of the methods listed below (method (1) to method (4)). Furthermore, the damaged portion removal unit 94 fills the exclusion region in the dermal fingerprint image with a background color, and then outputs the image.

Method (1): A region whose degree of abnormality is equal to or greater than a predetermined threshold value and within 16 pixels in the vicinity thereof (this value "16" may be set to a different value) is taken as an exclusion region.

Method (2): Extracts a region where the degree of abnormality is equal to or greater than a predetermined threshold value, and treats the region including the region inside the abnormal region as an exclusion region by means of an image expansion and contraction process.

Method (3): A region where the degree of abnormality is equal to or greater than a predetermined threshold is taken as an abnormal region, and a dermal fingerprint position that is furthest away from the abnormal region is detected. Also, a region within which the dermal ridge line direction and the dermal ridge line pitch continuously vary from that position (no abnormal discontinuity) within a predetermined distance is taken as an effective region. The portion other than the effective region is taken as an exclusion region.

Method (4): A region where the degree of abnormality is equal to or greater than a predetermined threshold is taken as an abnormal region, and a dermal fingerprint position that is furthest away from the abnormal region is detected. Also, the region outside the circle which is a circle centered at that position and whose radius is the distance from that position to the abnormal region is taken as the exclusion region.

That is to say, the repair unit 214a repairs the damage by removing the information of the dermal fingerprint image of the exclusion region determined based on the singular region, from the entire dermal fingerprint image. Here, the damaged portion is ignored or excluded from the evaluation, but the term "repair" is also used to include the meaning of correcting the verifiable image.

Whether to employ the method out of the above methods (1) to (4) can be controlled for example by parameters given from the outside. As another method, the method (4) is applied with the highest priority, and the method (3) is applied when the region (area) of the dermal fingerprint image necessary for the collation processing cannot be obtained as a result thereof, and from thereon, the method (2) and the method (1) may be applied in this order in a similar manner.

Although the processing by the Z type surgery dermal fingerprint restoration unit 92 supports only damaged dermal fingerprints caused by surgery of a specific method, if there is no clear surgical trace, there is a possibility that the original preoperative dermal fingerprint cannot be restored. Even in such a case, there is an advantage that it can still be collated with the dermal fingerprint of the principal person before processing was done on the finger (alternatively, the fingerprint of the principal person before processing), by excluding the portion where the processing of the fingerprint has been performed, by means of the method using the damaged portion removal unit 94.

Also, the case of this modified example, in terms of removing information on the damaged portion, is an example of a case where the repair unit 214a, concerning the dermal image information included in a singular region among the dermal image information acquired by the dermal information acquisition unit 11, repairs the damage in the dermal image information that has occurred in this singular region.

The process performed by the repair unit 214 (or a modified example thereof) (the process of restoring a Z type surgery dermal fingerprint to a state before surgical operation, or the process of excluding the damaged portion) does not necessarily guarantee accurate restoration of the dermal fingerprint before the surgery. For example, a normal dermal fingerprint of a finger without a surgery history may be determined as having undergone a surgical operation as a result of a false determination, and there may be some cases where it may still be processed. However, for example, by means of the collation unit 116 checking both the dermal fingerprint image prior to the processing by the repair unit 214 (or a modified example thereof) and the processed dermal fingerprint image against the pre-registered information storage unit 62 (fingerprint database), it is possible to reduce the risk of lowering the authentication rate. When collating both dermal fingerprint images of before and after processing with the pre-registered information storage unit 62, if one of the dermal fingerprint images coincides with a pre-registered dermal fingerprint image (or fingerprint image), it can be regarded as matching with the pre-registered image.

Also, as a result of the processing performed by the repair unit 214 (or a modified example thereof), there is also a risk that the dermal fingerprint image after the restoration process coincides with the dermal fingerprint of another person. However, if the operation is performed such that an operator or the like separately makes a confirmation using means other than dermal fingerprints (for example, a face photograph, etc.) instead of making a final decision based only on that match, this type of risk in misidentification of another person can be reduced.

According to the configuration of the second exemplary embodiment, since the repair unit 214 (or its modification example) repairs the image of the papillary layer based on the information acquired by the singular region detection result acquisition unit 12, the dermal image information processing device 5 is able to perform collation processing using the information after repair.

As described above, for the dermal image information included in the singular region of the dermal image information acquired by the dermal image information acquiring unit 11, the repair unit 214 repairs the damage of the dermal image information in that singular region. Then, the collation unit 116 regards the dermal image information repaired by the repair unit 214 as being in a region other than the singular region and performs a collation processing.

In this way, by repairing the damage of the dermal image information by the repair unit 214, it is possible to improve the accuracy of the collation processing performed by the collation unit 116.

Furthermore, the repair unit 214 excludes the exclusion region defined based on the singular region, from the image of the papillary layer, to thereby repair the damage.

Thus, even when the dermal fingerprint before surgery can not be restored, such as in the case where a clear surgical trace is not seen, the repair unit 214 can perform collation by excluding the part where the dermal fingerprint has been deformed by surgery. As a result, the accuracy of the collation processing performed by the collation unit 116 can be improved.

Moreover, based on the correlation between the dermal ridge line direction information of each portion included in the image of the papillary layer, and the template of the abnormal dermal ridge line direction pattern held preliminarily, the repair unit 214 finds an evaluation value representing the degree of abnormal dermal ridge line directional pattern possession in the dermal ridge line direction information for each of the portions, and extracts the straight line component of the evaluation value in the image of the papillary layer. In addition, the repair unit 214 mutually replaces the image of the papillary layer included in the first polygon and the second polygon defined based on these straight line components to thereby repair the damage.

As a result, the repair unit 214 can restore the dermal fingerprint image before surgery, from the dermal fingerprint image in which the dermis is partially replaced by surgery, such as a dermal fingerprint image of Z type surgery.

Next, the configuration of a third exemplary embodiment of the present invention will be described with reference to FIG. 17.

FIG. 17 is a schematic block diagram showing a configuration of a dermal image information processing device according to the third exemplary embodiment of the present invention. The dermal image information processing device 301 shown in FIG. 17 includes a dermal image information acquisition unit 302, and a singular region detection unit 303.

With such a configuration, the dermal image information acquisition unit 302 acquires image information of the papillary layer. Moreover, the singular region detection unit 303 detects a singular region indicating damage of the papilla layer, based on the image information of the papilla layer acquired by the dermal image information acquisition unit 302.

As a result, the singular region detection unit 303 can determine the presence or absence of the singular region with high accuracy even when the state of the skin is not good, such as in the case where the fingerprint is unclear due to roughness, wrinkles due to aging and the like, or burns. Thereby, the dermal image information processing device 301 can reduce the possibility that the existence of the singular region is missed and the same person is erroneously determined as a different person.

A program for realizing all or a part of the functions of the dermal image information processing device 3 or 5 may be recorded on a computer-readable recording medium, and the program recorded on the recording medium may be read and executed to thereby perform the processing of each unit. The term "computer system" referred to here includes hardware such as an OS and peripheral devices.

The term "computer-readable recording medium" refers to a portable medium such as a flexible disk, a magnetic optical disk, a ROM, and a CD-ROM, or a memory device such as a hard disk built in a computer system. Furthermore, the "computer-readable recording medium" may include one that dynamically holds a program for a short time, such as a communication line for transmitting a program via a network such as the Internet or a communication line such as a telephone line, and one that holds a program for a certain period of time such as a volatile memory inside a computer system serving as a server or a client in that case. Further, the program above may be for realizing a part of the above-described functions, or may be one which can realize the above-mentioned functions in combination with a program already recorded in the computer system.

The exemplary embodiments of the present invention have been described above in detail with reference to the figures. However, the specific configuration is not limited to these exemplary embodiments, and designs and the like without deviating from the scope of the present invention are included.

INDUSTRIAL APPLICABILITY

The present invention may be applied to a dermal image information processing device, a dermal image information processing method, and a program.

REFERENCE SYMBOLS 1, 4 Dermal image information processing system
2 OCT
3, 5, 301 Dermal image information processing device
11, 302 Dermal image information acquisition unit
12 Singular region detection result acquisition unit
61, 303 Singular region detection unit
62 Pre-registered information storage unit
70 Dermal ridge line direction detection unit
71 Dermal ridge line pitch detection unit
72 Dermal ridge line intensity detection unit
73 Directional singular point detection unit
74 Abnormal pattern detection unit
75 Comb type direction pattern detection unit
76 ω type direction pattern detection unit
77 X type direction pattern detection unit
78 Dermal ridge line breakage detection unit
79 Cutout work detection unit
91, 93 Damaged portion detection unit
92 Z type surgery dermal fingerprint restoration unit
94 Damaged portion removal unit
116 Collation unit
121 Result output unit
214, 214a Repair unit

The invention claimed is:

1. A dermal image information processing device comprising:
   a memory; and
   a hardware component that reads data from the memory and performs:
   acquiring dermal image information showing ridge lines in a papillary layer;
   detecting a singular region caused by a surgical operation in the dermal image;
   determining a type of the surgical operation that is a cause of generation of the singular region;
   generating a repaired image showing ridge lines in a papillary layer prior to the surgical operation, based on the type of the surgical operation; and
   collating the repaired image with a pre-registered dermal image.

2. The dermal image information processing device according to claim 1, wherein
   the ridge lines are ridge lines in the papillary layer of a finger, and
   the hardware component performs:
   detecting that the finger has undergone a surgical operation of swapping two regions of the finger;
   specifying the two regions swapped through the surgical operation; and
   generating the repaired image by mutually replacing the specified two parts.

3. The dermal image information processing device according to claim 1, wherein
   the ridge lines are ridge lines in the papillary layer of a finger, and
   the hardware component performs:
   detecting that the finger has undergone a surgical operation including removing a part of the finger and suturing a part around the removed part;
   specifying the part removed through the surgical operation, based on pitches of the ridge lines; and
   generating the repaired image showing the ridge lines except the removed part.

4. The dermal image information processing device according to claim 1, wherein
   the ridge lines are ridge lines in the papillary layer of a finger, and
   the hardware component performs detecting that the finger has undergone the surgical operation, by detecting:
   that a pattern of direction of the ridge lines shows a particular pattern; or that pitches of the ridge lines satisfy a predetermined condition.

5. A dermal image information processing method comprising:
acquiring dermal image information showing ridge lines in a papillary layer;
detecting a singular region caused by a surgical operation;
determining a type of the surgical operation that is a cause of generation of the singular region;
generating a repaired image showing ridge lines in a papillary layer prior to the surgical operation, based on the type of the surgical operation; and
collating the repaired image with a pre-registered dermal image.

6. The dermal image information processing method according to claim 5, wherein
the ridge lines are ridge lines in the papillary layer of a finger, and
the dermal image information processing method further comprises:
detecting that the finger has undergone a surgical operation of swapping two regions of the finger;
specifying the two regions swapped through the surgical operation; and
generating the repaired image by mutually replacing the specified two parts.

7. The dermal image information processing method according to claim 5, wherein
the ridge lines are ridge lines in the papillary layer of a finger, and
the dermal image information processing method further comprises:
detecting that the finger has undergone a surgical operation including removing a part of the finger and suturing a part around the removed part;
specifying the part removed through the surgical operation, based on pitches of ridge lines; and
generating the repaired image showing the ridge lines except the removed part.

8. The dermal image information processing method according to claim 5, wherein
the ridge lines are ridge lines in the papillary layer of a finger, and
the dermal image information processing method further comprises detecting that the finger has undergone the surgical operation, by detecting:
that a pattern of direction of the ridge lines shows a particular pattern; or
that pitches of the ridge lines satisfy a predetermined condition.

9. A non-transitory computer-readable storage medium storing a program that causes a computer to perform:
acquiring dermal image information showing ridge lines in a papillary layer;
detecting a singular region caused by a surgical operation;
determining a type of the surgical operation that is a cause of generation of the singular region;
generating a repaired image showing ridge lines in a papillary layer prior to the surgical operation, based on the type of the surgical operation; and
collating the repaired image with a pre-registered dermal image.

10. The storage medium according to claim 9, wherein
the ridge lines are ridge lines in the papillary layer of a finger, and
the program further causes the computer to perform:
detecting that the finger has undergone a surgical operation of swapping two regions of the finger;
specifying the two regions swapped through the surgical operation; and
generating the repaired image by mutually replacing the specified two parts.

11. The storage medium according to claim 9, wherein
the ridge lines are ridge lines in the papillary layer of a finger, and
the program further causes the computer to perform:
detecting that the finger has undergone a surgical operation including removing a part of the finger and suturing a part around the removed part;
specifying the part removed through the surgical operation, based on pitches of ridge lines; and
generating the repaired image showing the ridge lines except the removed part.

12. The storage medium according to claim 9, wherein
the ridge lines are ridge lines in the papillary layer of a finger, and
the program further causes the computer to perform detecting that the finger has undergone the surgical operation, by detecting:
that a pattern of direction of the ridge lines shows a particular pattern; or
that pitches of the ridge lines satisfy a predetermined condition.

* * * * *